(12) United States Patent
Barr

(10) Patent No.: US 12,409,620 B1
(45) Date of Patent: Sep. 9, 2025

(54) DIE ASSEMBLY AND METHOD OF FORMING A VINYL RECORD

(71) Applicant: TK Mold & Engineering, Inc., Bruce Township, MI (US)

(72) Inventor: Thomas William Barr, Shelby Township, MI (US)

(73) Assignee: TK MOLD & ENGINEERING, INC., Bruce Township, MI (US)

( * ) Notice: Subject to any disclaimer, the term of this patent is extended or adjusted under 35 U.S.C. 154(b) by 211 days.

(21) Appl. No.: 18/204,440

(22) Filed: Jun. 1, 2023

(51) Int. Cl.
| | |
|---|---|
| B29D 17/00 | (2006.01) |
| B29C 33/02 | (2006.01) |
| B29C 33/30 | (2006.01) |
| B29L 17/00 | (2006.01) |

(52) U.S. Cl.
CPC ............ B29D 17/002 (2013.01); B29C 33/02 (2013.01); B29C 33/305 (2013.01); *B29L 2017/003* (2013.01)

(58) Field of Classification Search
CPC ..... B29C 33/02; B29C 33/302; B29C 33/305; B29D 17/002; B29L 2017/003
See application file for complete search history.

(56) References Cited

U.S. PATENT DOCUMENTS

| | | | |
|---|---|---|---|
| 1,307,812 A * | 6/1919 | Errickson | ............... B29C 43/02 165/170 |
| 3,941,547 A | 3/1976 | Hunyar et al. | |
| 2021/0283872 A1* | 9/2021 | Brown | ................... B29C 43/02 |

* cited by examiner

*Primary Examiner* — Yunju Kim
(74) *Attorney, Agent, or Firm* — NEXUS LAW PLLC

(57) ABSTRACT

A die assembly and a method of forming a vinyl record are provided. The assembly includes a base circular-shaped plate having an outer ring-shaped gasket groove, an inner O-ring groove, and a plurality of concentric grooves extending from a primary surface into the base circular-shaped plate. The assembly includes an O-ring that is disposed in the inner O-ring groove, and an outer ring-shaped gasket disposed in the outer ring-shaped gasket groove. The assembly includes a contacting circular-shaped plate having an engagement surface and a plurality of concentric channels such that a plurality of concentric finger portions are formed on the contacting circular-shaped plate. The plurality of concentric finger portions are partially disposed in the plurality of concentric grooves and contact the base circular-shaped plate.

12 Claims, 31 Drawing Sheets

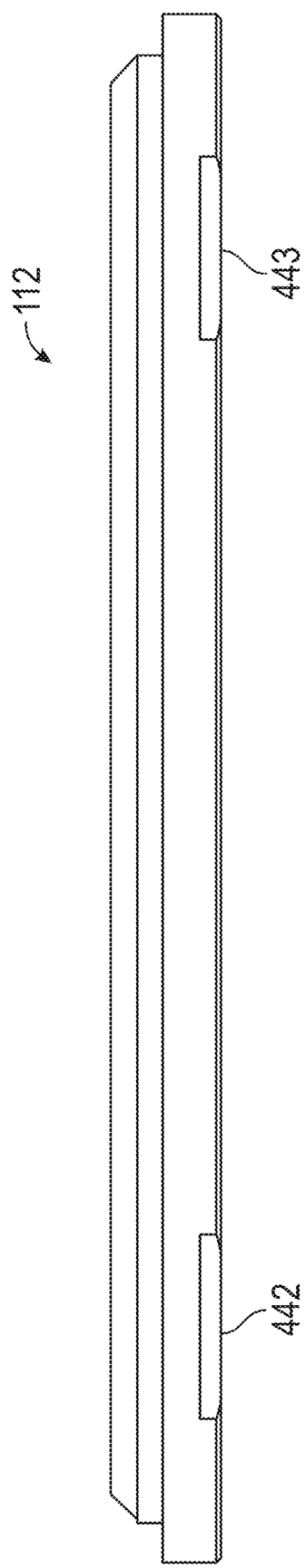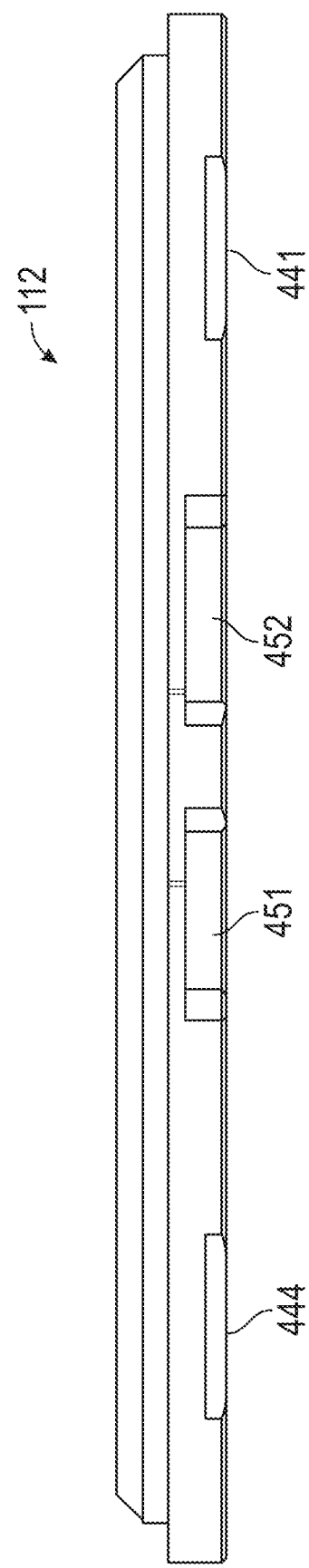

User provides a vinyl record manufacturing system having a first die assembly, a second die assembly, a first stamper plate coupled to the first die assembly, a second stamper plate coupled to the second die assembly, a heating system, a cooling system, and an actuator; the first die assembly includes a base circular-shaped plate having a primary surface and an outer ring-shaped gasket groove, an inner o-ring groove, and a plurality of concentric grooves extending from the primary surface into the base circular-shaped plate; the plurality of concentric grooves being disposed between the outer ring-shaped gasket groove and the inner o-ring groove; the base circular-shaped plate having an inlet aperture extending from an outer peripheral surface thereof into the base circular-shaped plate to a central region of the base circular-shaped plate, the inlet aperture communicating with a first vertical aperture that extends from an end of the inlet aperture and through the primary surface; the base circular-shaped plate having an outlet aperture extending from the outer peripheral surface into the base circular-shaped plate, the outlet aperture communicating with a second vertical aperture that extends from an end of the outlet aperture and through the primary surface; the base circular-shaped plate having a plurality of peripheral bolt apertures extending therethrough that are disposed radially outwardly from the outer ring-shaped gasket groove; the first die assembly further includes an outer ring-shaped gasket disposed in the outer ring-shaped gasket groove; the first die assembly further includes an o-ring being disposed in the inner o-ring groove; the first die assembly further includes a contacting circular shaped plate having an engagement surface and a plurality of concentric channels extending from the engagement surface into the contacting circular-shaped plate such that a plurality of concentric finger portions are formed on the contacting circular-shaped plate, each concentric finger portion being disposed between two concentric channels of the plurality of concentric channels; the contacting circular-shaped plate having a plurality of radial passages fluidly interconnecting the plurality of concentric channels; the contacting circular-shaped plate being disposed on the base circular-shaped plate such that the plurality of concentric finger portions are partially disposed in the plurality of concentric grooves and contact the base circular-shaped plate, the inlet aperture fluidly communicates with the plurality of concentric channels, the outlet aperture fluidly communicates with the plurality of concentric channels, and a flow path

FIG. 35

DIE ASSEMBLY AND METHOD OF FORMING A VINYL RECORD

BACKGROUND

Die assemblies have been utilized to form vinyl records. The die assemblies have metal bonded plates which are inseparable after manufacturing without damaging the metal bonded plates. Accordingly, manufactures of vinyl records are not able to separate the metal bonded plates apart from one another for maintenance purposes and therefore throw the die assemblies away when the die assemblies have impaired functionality such as leaking fluid therefrom.

The inventor herein has recognized a need for an improved die assembly and method for forming a vinyl record that minimizes and/or reduces the above-mentioned problem.

SUMMARY

A die assembly in accordance with an exemplary embodiment is provided. The die assembly includes a base circular-shaped plate having a primary surface and an outer ring-shaped gasket groove, an inner O-ring groove, and a plurality of concentric grooves extending from the primary surface into the base circular-shaped plate. The plurality of concentric grooves are disposed between the outer ring-shaped gasket groove and the inner O-ring groove. The base circular-shaped plate has an inlet aperture extending from an outer peripheral surface thereof into the base circular-shaped plate to a central region of the base circular-shaped plate. The inlet aperture communicates with a first vertical aperture that extends from an end of the inlet aperture and through the primary surface. The base circular-shaped plate has an outlet aperture extending from the outer peripheral surface into the base circular-shaped plate. The outlet aperture communicates with a second vertical aperture that extends from an end of the outlet aperture and through the primary surface. The base circular-shaped plate has a plurality of peripheral bolt apertures extending therethrough that are disposed radially outwardly from the outer ring-shaped gasket groove. The die assembly further includes an outer ring-shaped gasket disposed in the outer ring-shaped gasket groove. The die assembly further includes an O-ring that is disposed in the inner O-ring groove. The die assembly further includes a contacting circular-shaped plate having an engagement surface and a plurality of concentric channels extending from the engagement surface into the contacting circular-shaped plate such that a plurality of concentric finger portions are formed on the contacting circular-shaped plate. Each concentric finger portion is disposed between two concentric channels of the plurality of concentric channels. The contacting circular-shaped plate has a plurality of radial passages fluidly interconnecting the plurality of concentric channels. The contacting circular-shaped plate is disposed on the base circular-shaped plate such that the plurality of concentric finger portions are partially disposed in the plurality of concentric grooves and contact the base circular-shaped plate. The inlet aperture fluidly communicates with the plurality of concentric channels. The outlet aperture fluidly communicates with the plurality of concentric channels. A flow path is formed by and through the inlet aperture, the first vertical aperture, the plurality of concentric channels, the plurality of radial passages, the second vertical aperture, and the outlet aperture. The contacting circular-shaped plate has a plurality of peripheral bolt holes extending therein that are disposed radially outwardly from the plurality of concentric channels. The die assembly further includes a plurality of bolts extending through the plurality of peripheral bolt apertures of the base circular-shaped plate and further into the plurality of peripheral bolt holes of the contacting circular-shaped plate to couple the base circular-shaped plate to the contacting circular-shaped plate.

A method of forming a vinyl record in accordance with another exemplary embodiment is provided. The method includes providing a vinyl record manufacturing system having a first die assembly, a second die assembly, a first stamper plate coupled to the first die assembly, a second stamper plate coupled to the second die assembly, a heating system, and a least one actuator. The first die assembly includes a base circular-shaped plate having a primary surface and an outer ring-shaped gasket groove, an inner O-ring groove, and a plurality of concentric grooves extending from the primary surface into the base circular-shaped plate. The plurality of concentric grooves are disposed between the outer ring-shaped gasket groove and the inner O-ring groove. The base circular-shaped plate has an inlet aperture extending from an outer peripheral surface thereof into the base circular-shaped plate to a central region of the base circular-shaped plate. The inlet aperture communicates with a first vertical aperture that extends from an end of the inlet aperture and through the primary surface. The base circular-shaped plate has an outlet aperture extending from the outer peripheral surface into the base circular-shaped plate. The outlet aperture communicates with a second vertical aperture that extends from an end of the outlet aperture and through the primary surface. The base circular-shaped plate has a plurality of peripheral bolt apertures extending therethrough that are disposed radially outwardly from the outer ring-shaped gasket groove. The first die assembly further includes an outer ring-shaped gasket disposed in the outer ring-shaped gasket groove. The first die assembly further includes an O-ring that is disposed in the inner O-ring groove. The first die assembly further includes a contacting circular-shaped plate having an engagement surface and a plurality of concentric channels extending from the engagement surface into the contacting circular-shaped plate such that a plurality of concentric finger portions are formed on the contacting circular-shaped plate. Each concentric finger portion is disposed between two concentric channels of the plurality of concentric channels. The contacting circular-shaped plate has a plurality of radial passages fluidly interconnecting the plurality of concentric channels. The contacting circular-shaped plate is disposed on the base circular-shaped plate such that the plurality of concentric finger portions are partially disposed in the plurality of concentric grooves and contact the base circular-shaped plate. The inlet aperture fluidly communicates with the plurality of concentric channels. The outlet aperture fluidly communicates with the plurality of concentric channels. A flow path is formed by and through the inlet aperture, the first vertical aperture, the plurality of concentric channels, the plurality of radial passages, the second vertical aperture, and the outlet aperture. The contacting circular-shaped plate has a plurality of peripheral bolt holes extending therein that are disposed radially outwardly from the plurality of concentric channels. The first die assembly further includes a plurality of bolts extending through the plurality of peripheral bolt apertures of the base circular-shaped plate and further into the plurality of peripheral bolt holes of the contacting circular-shaped plate to couple the base circular-shaped plate to the contacting circular-shaped plate. The method further includes disposing a polymeric puck between the first and second stamper plates. The method further includes heating the first and second die assemblies by pumping steam through the flow path of the first die assembly and through a flow path in the second die assembly. The method further includes moving the first and second die assemblies toward one another such that the first and second stamper plates compress the polymeric puck to form the vinyl record.

BRIEF DESCRIPTION OF THE DRAWINGS

FIG. 25 is a side view of the contacting circular-shaped plate of FIG. 23;

FIG. 26 is another side view of the contacting circular-shaped plate of FIG. 23;

FIGS. 35-36 are flowcharts of a method of forming a vinyl record utilizing the vinyl record manufacturing system in accordance with another exemplary embodiment.

DETAILED DESCRIPTION

Referring to FIGS. 1-4, a vinyl record manufacturing system 20 in accordance with an exemplary embodiment will be explained. The vinyl record manufacturing system 20 produces a vinyl record 28 (shown in FIG. 4) utilized the polymeric puck 24 (shown in FIG. 2).

Figure 1:
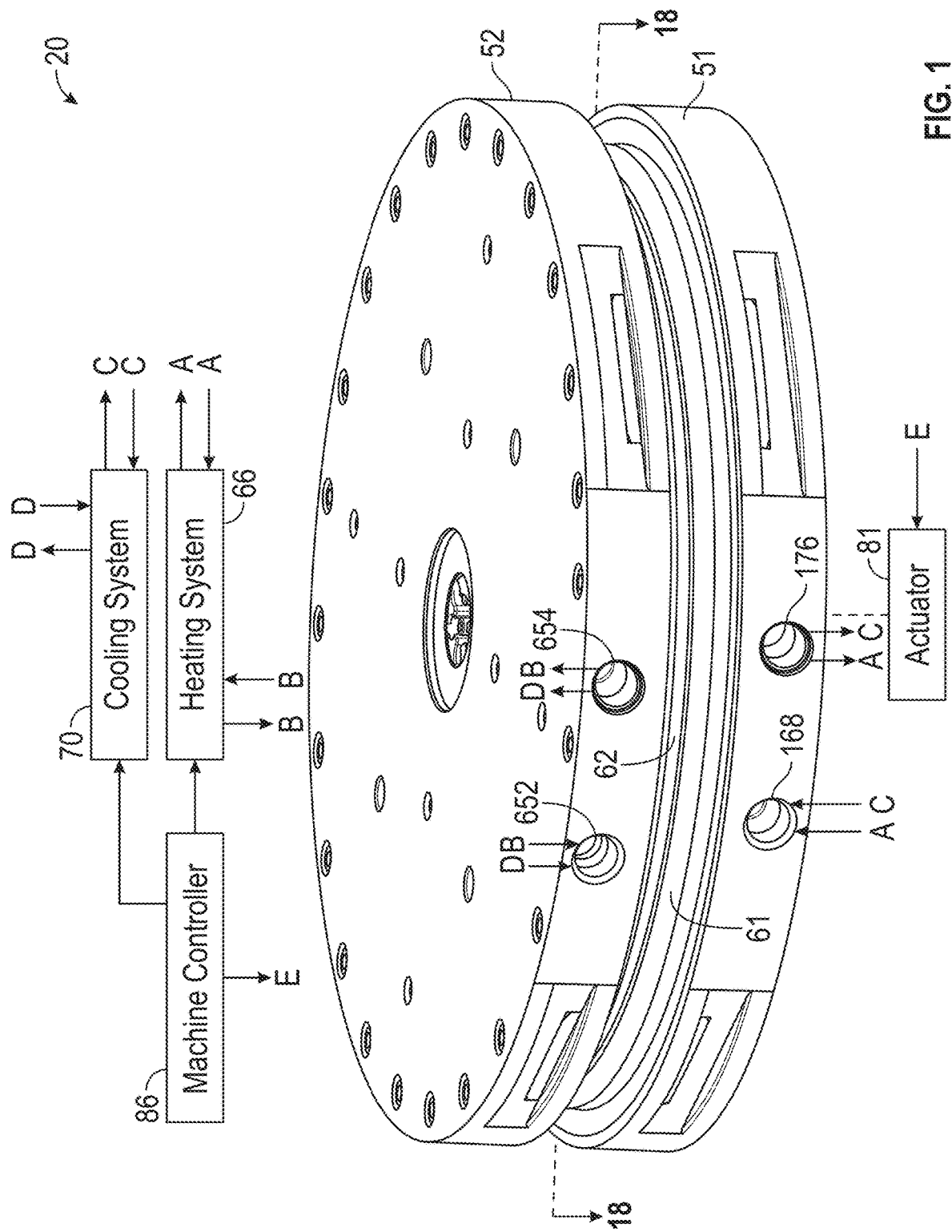
FIG. 1 is a schematic of a vinyl record manufacturing system having first and second die assemblies, first and second stamper plates, a heating system, a cooling system, an actuator, and a machine controller.

Referring to FIG. 1, the vinyl record manufacturing system 20 includes a first die assembly 51, a second die assembly 52, a first stamper plate 61, a second stamper plate 62, a heating system 66, a cooling system 70, an actuator 81, and a machine controller 86.

Referring to FIGS. 5-31, the first die assembly 51 is provided to hold the first stamper plate 61 thereon and to heat and cool the first stamper plate 61. Referring to FIGS. 5 and 14-31, the first die assembly 51 includes a base circular-shaped plate 100, an outer ring-shaped gasket 104, an O-ring 108, a contacting circular-shaped plate 112, a threaded bolt 116 (shown in FIG. 17), a center bushing 118 (shown in FIG. 5), and a nut 120.

Figure 5:
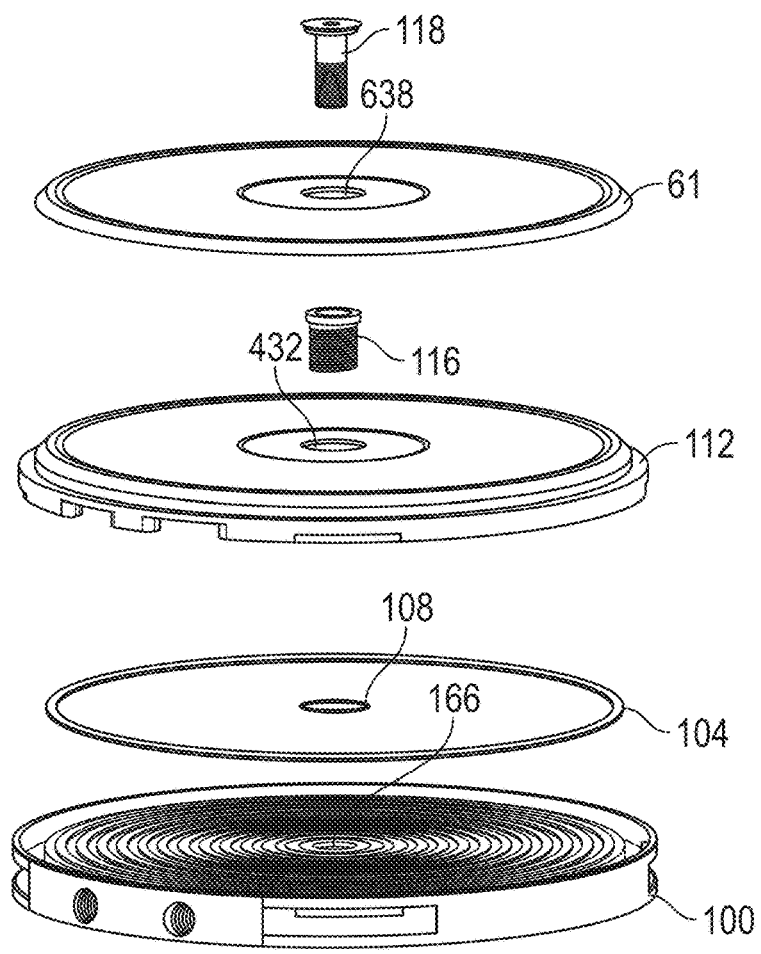
FIG. 5 is an exploded view of the first die assembly and the first stamper plate of FIG. 1.
Figure 6:
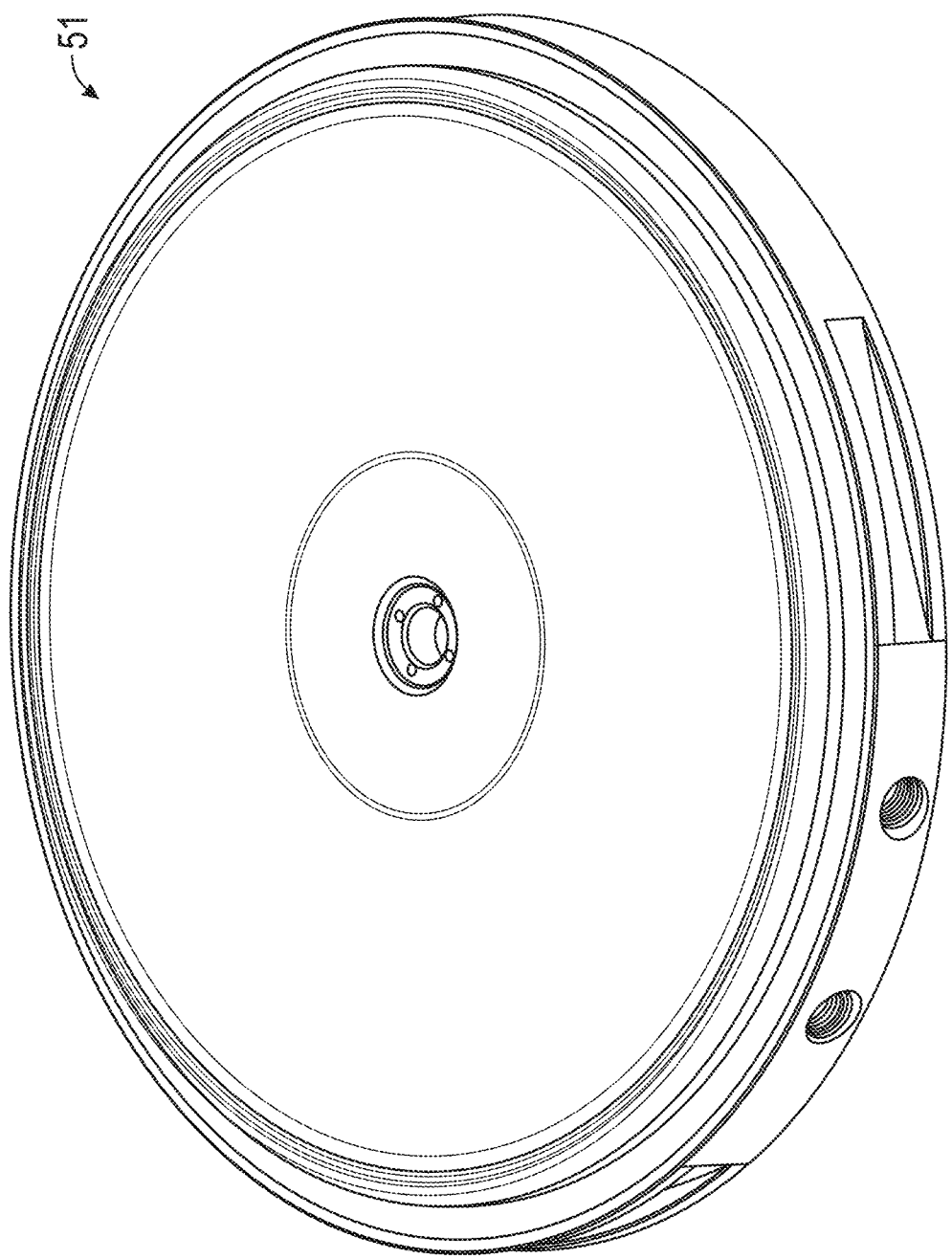
FIG. 6 is an isometric view of the first die assembly of FIG. 1.
Figure 7:
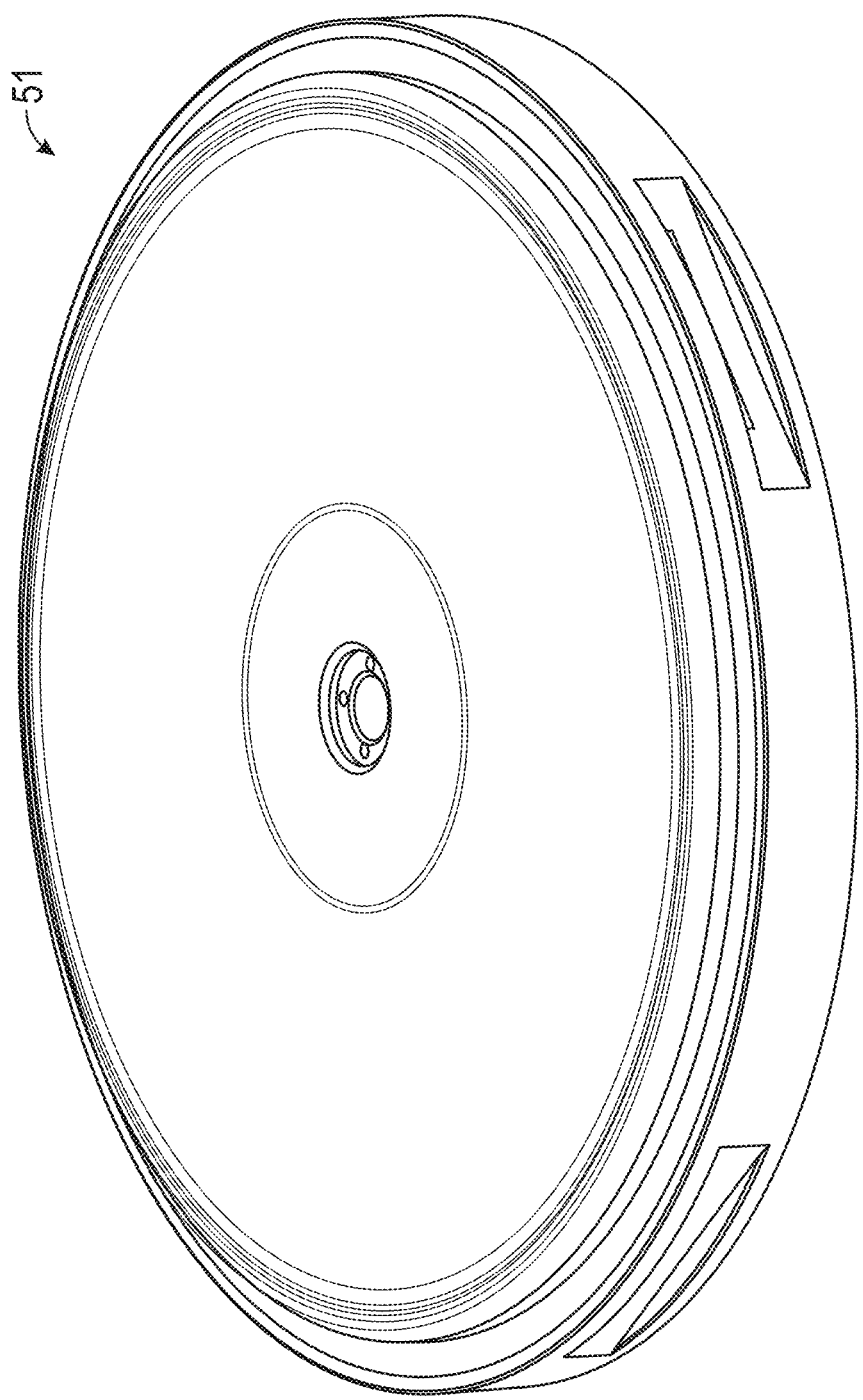
FIG. 7 is another isometric view of the first die assembly of FIG. 6.
Figure 8:
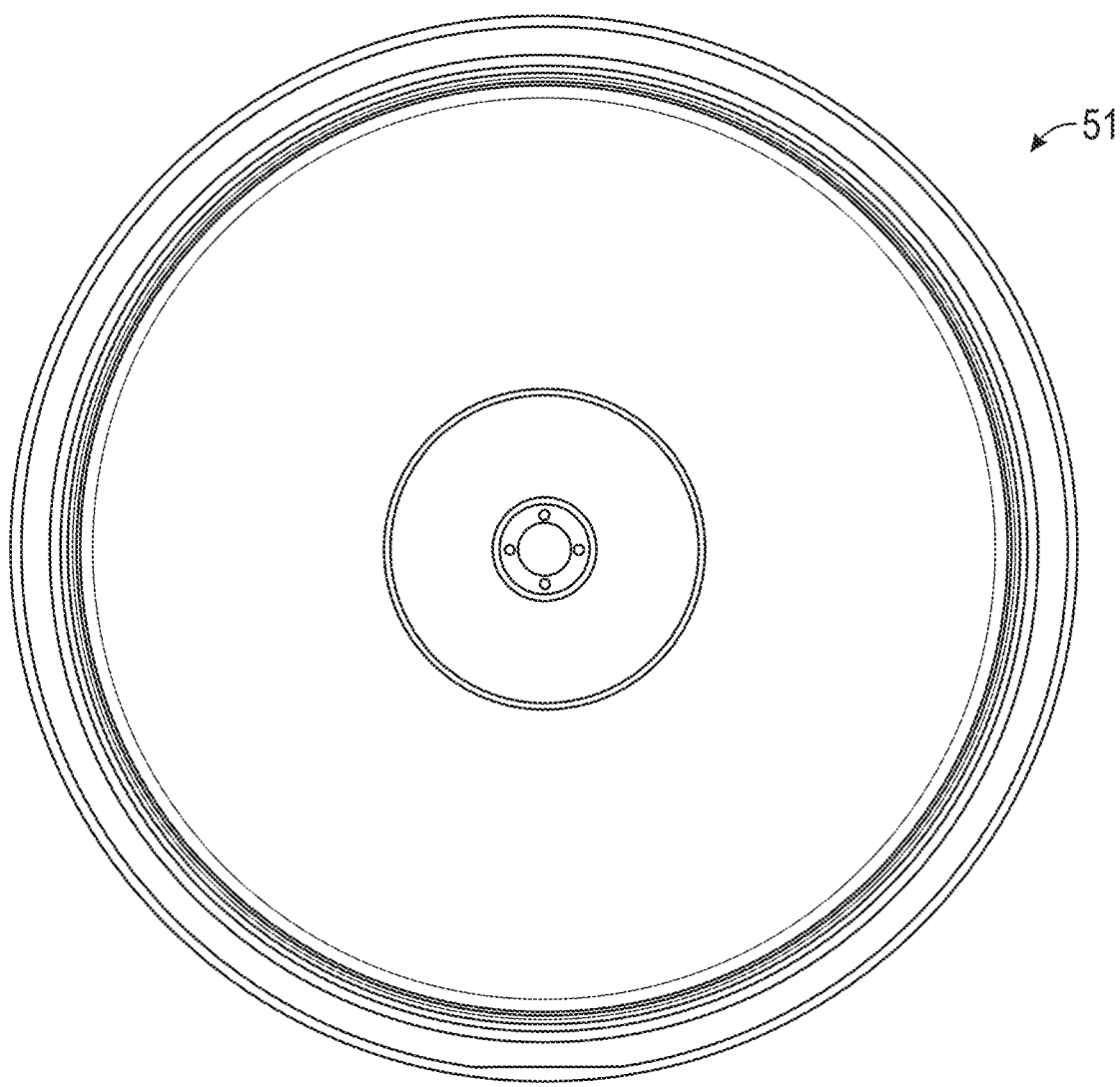
FIG. 8 is a top view of the first die assembly of FIG. 6.
Figure 19:
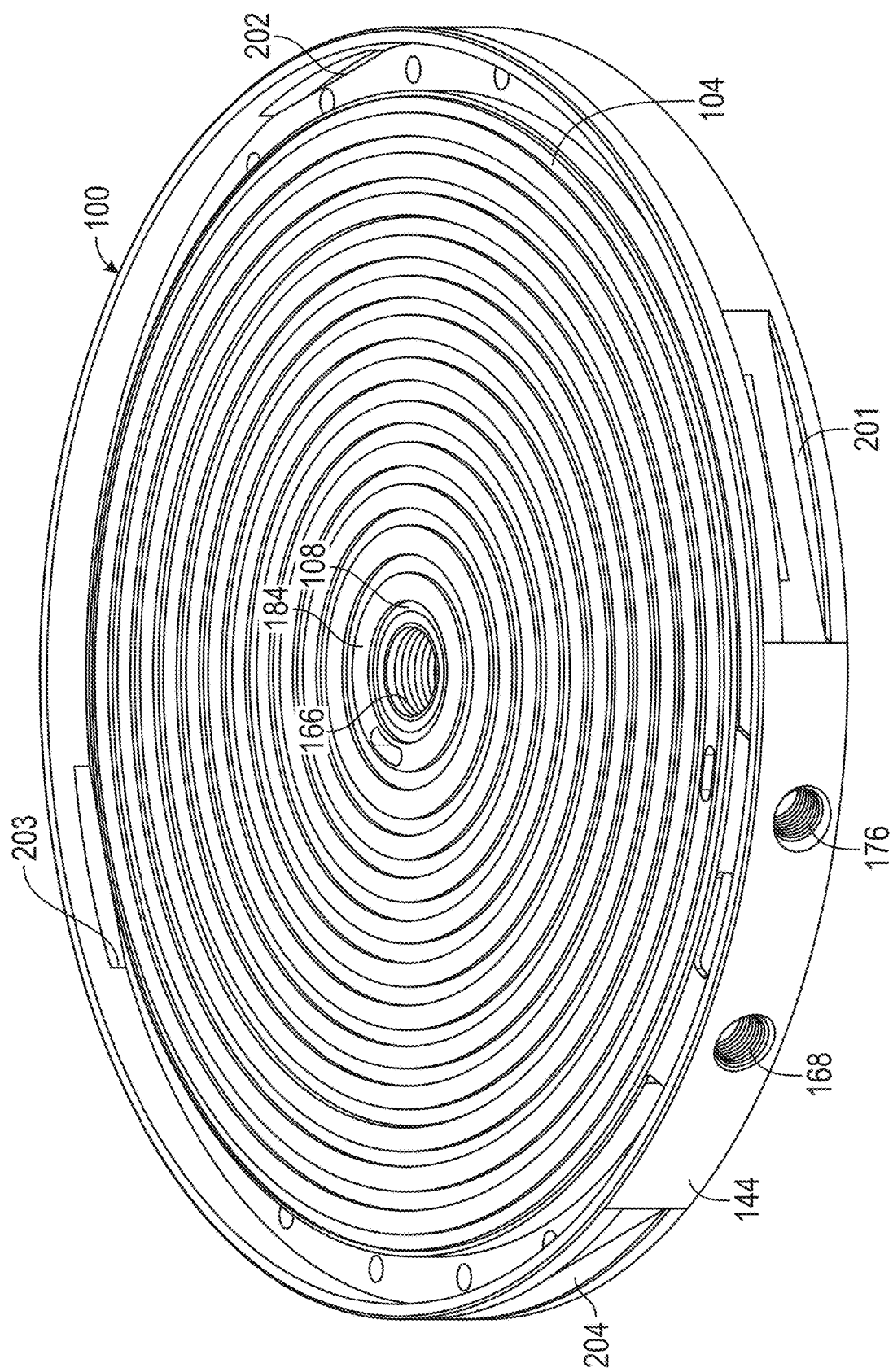
FIG. 19 is an isometric view of a base circular-shaped plate utilized in the first die assembly of FIG. 6.

Referring to FIG. 5, an advantage of the first die assembly 51 is that the assembly 51 utilizes a base circular-shaped plate 100 having a plurality of concentric grooves 160 receiving at least a portion of a plurality of concentric finger portions 420 of the contacting circular-shaped plate 112 therein to partition portions of the assembly 51 for routing either steam or a cooled fluid therethrough. Referring to FIG. 19, another advantage of the first die assembly is that the assembly 51 utilizes an outer ring-shaped gasket 104 and an O-ring 108 to maintain fluid within desired regions of the assembly 51. Still further, the first die assembly 51 has an advantage of utilizing a plurality of bolts 122 to couple together the base circular-shaped plate 100 and the contacting circular-shaped plate 112 without the plates 100, 112 being welded together, metal bonded together, or permanently bonded together using another means such as an adhesive or epoxy. As a result, a user can desirably separate the plates 100, 112 to perform maintenance on the plates 100, 112.

Referring to FIGS. 14-18, the base circular-shaped plate 100 is disposed on and coupled to the contacting circular-shaped plate 112. The base circular-shaped plate 100 includes a primary surface 140, an outer peripheral surface 144, a back surface 148, an outer ring-shaped gasket groove 152, an inner O-ring groove 156, a plurality concentric grooves 160, a ring-shaped placement groove 164, a center aperture 166, an inlet aperture 168 (shown in FIGS. 14 and 18), a first vertical aperture 172 (shown in FIG. 14), an outlet aperture 176 (shown in FIG. 20), a second vertical aperture 180, a central region 184 (shown in FIG. 19), a plurality of peripheral apertures 188 (shown in FIGS. 9 and 10), first, second, third, and fourth clamping grooves 201, 202, 203, 204 (shown in FIGS. 11-13 and 19), and a plurality of inner bolt apertures 212 (shown in FIGS. 9 and 10). In an exemplary embodiment, the base circular-shaped plate 100 is constructed of steel.

Figure 14:
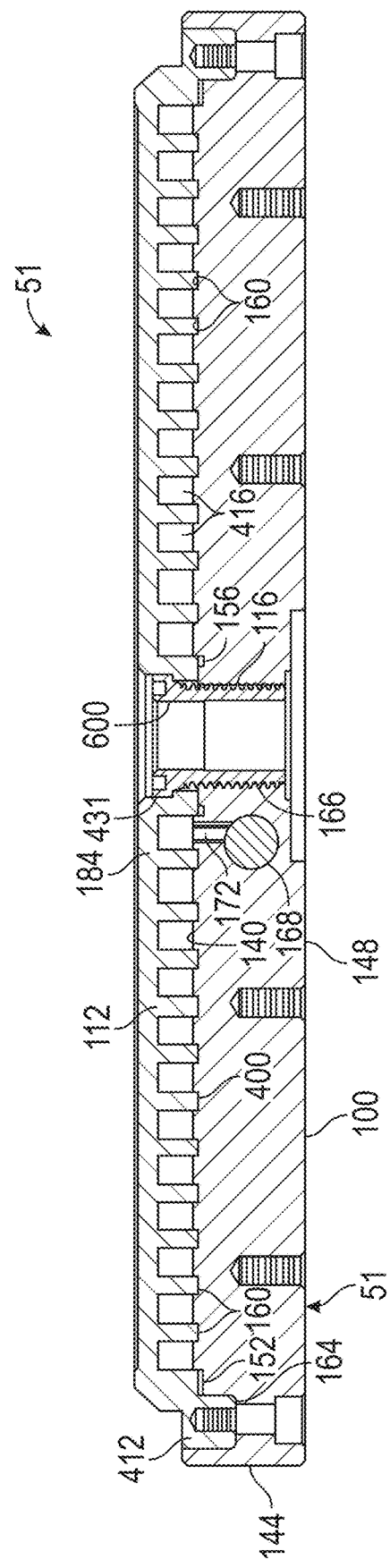
FIG. 14 is a cross-sectional view of the first die assembly of FIG. 13 taken along lines 14-14 in FIG. 13.

Referring to FIG. 14, the primary surface 140 and the back surface 148 are disposed opposite to and parallel to one another. Further, the outer peripheral surface 144 extends perpendicular to and between the primary surface 140 and the back surface 148.

Referring to FIGS. 14 and 19, the outer ring-shaped gasket groove 152 extends from the primary surface 140 into the base circular-shaped plate 100. The outer ring-shaped gasket groove 152 is provided to hold the outer ring-shaped gasket 104 therein. A radial width of the outer ring-shaped gasket groove 144 is greater than a radial width of the inner O-ring groove 156.

The inner O-ring groove 156 is disposed in the central region 184 of the base circular-shaped plate 100 and extends from the primary surface 140 into the base circular-shaped plate 100. The inner O-ring groove 156 is provided to hold the O-ring 108 therein.

Figure 16:
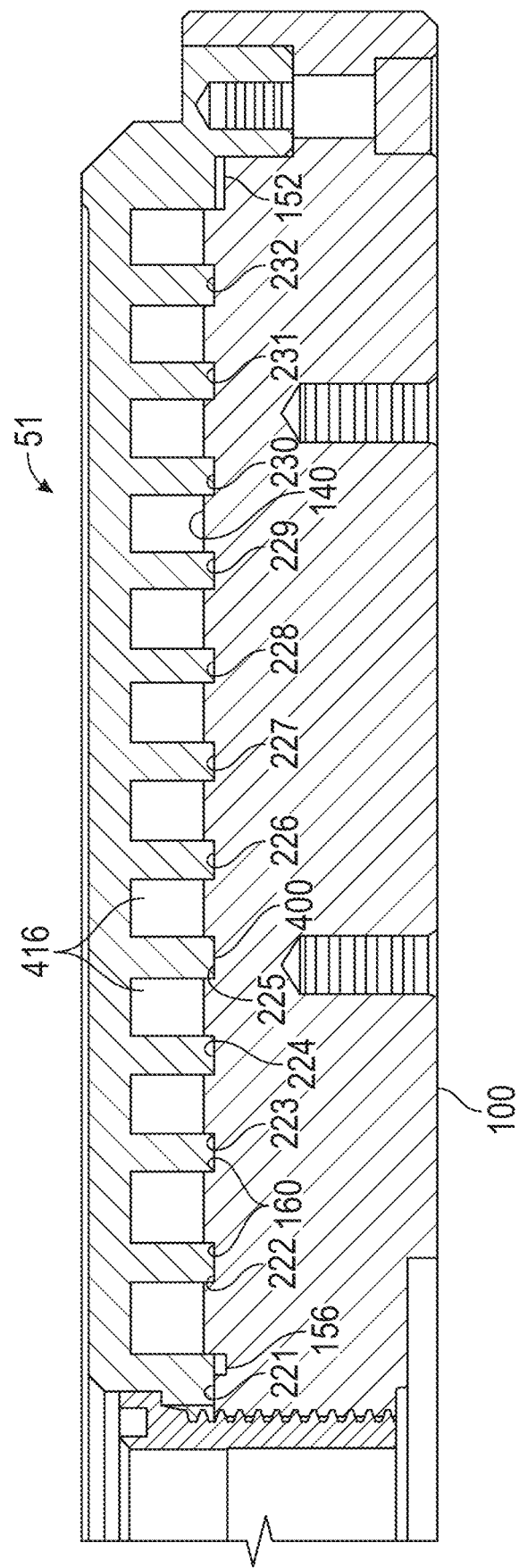
FIG. 16 is an enlarged view of another portion of the first die assembly of FIG. 14.
Figure 17:
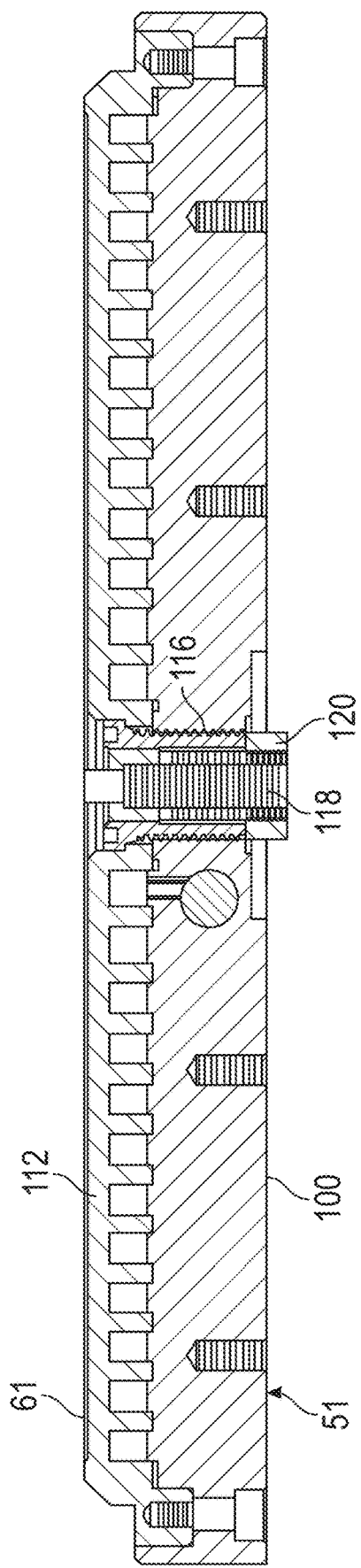
FIG. 17 is a cross-sectional view of the first die assembly of FIG. 3 taken along lines 17-17 in FIG. 3.
Figure 21:
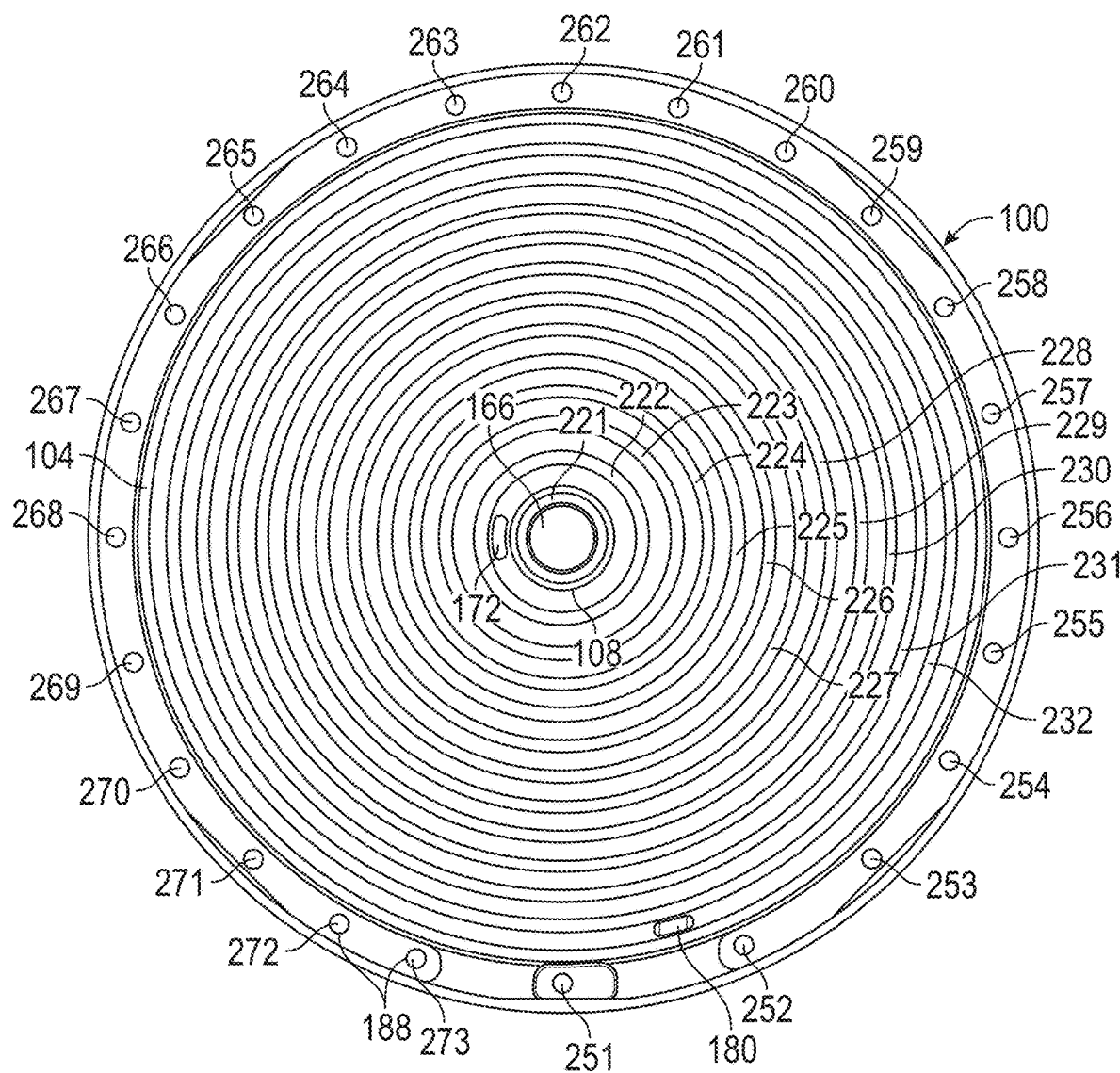
FIG. 21 is a top view of the base circular-shaped plate of FIG. 19.

Referring to FIGS. 16 and 21, the plurality of concentric grooves 160 extend from the primary surface 140 into the base circular-shaped plate 100. The plurality of concentric grooves 160 are disposed between the outer ring-shaped gasket groove 152 and the inner O-ring groove 156. The plurality concentric grooves 160 include concentric grooves 221, 222, 223, 224, 225, 226, 227, 228, 229, 230, 231, 232.

Referring to FIG. 14, the ring-shaped placement groove 164 is provided to position the contacting circular-shaped plate 112 on the base circular-shaped plate 100. The ring-shaped placement groove 164 extends from the primary surface 140 into the base circular-shaped plate 100. The ring-shaped placement groove 164 extends concentrically around the outer ring-shaped gasket groove 152. A depth of the ring-shaped placement groove 164 is greater than a depth of the outer ring-shaped gasket groove 152. Also, the depth of the ring-shaped placement groove 164 is greater than a depth of the plurality of concentric grooves 160. Further, a radial width of the ring-shaped placement groove 164 is greater than a radial width of the outer ring-shaped gasket groove 152.

Figure 20:
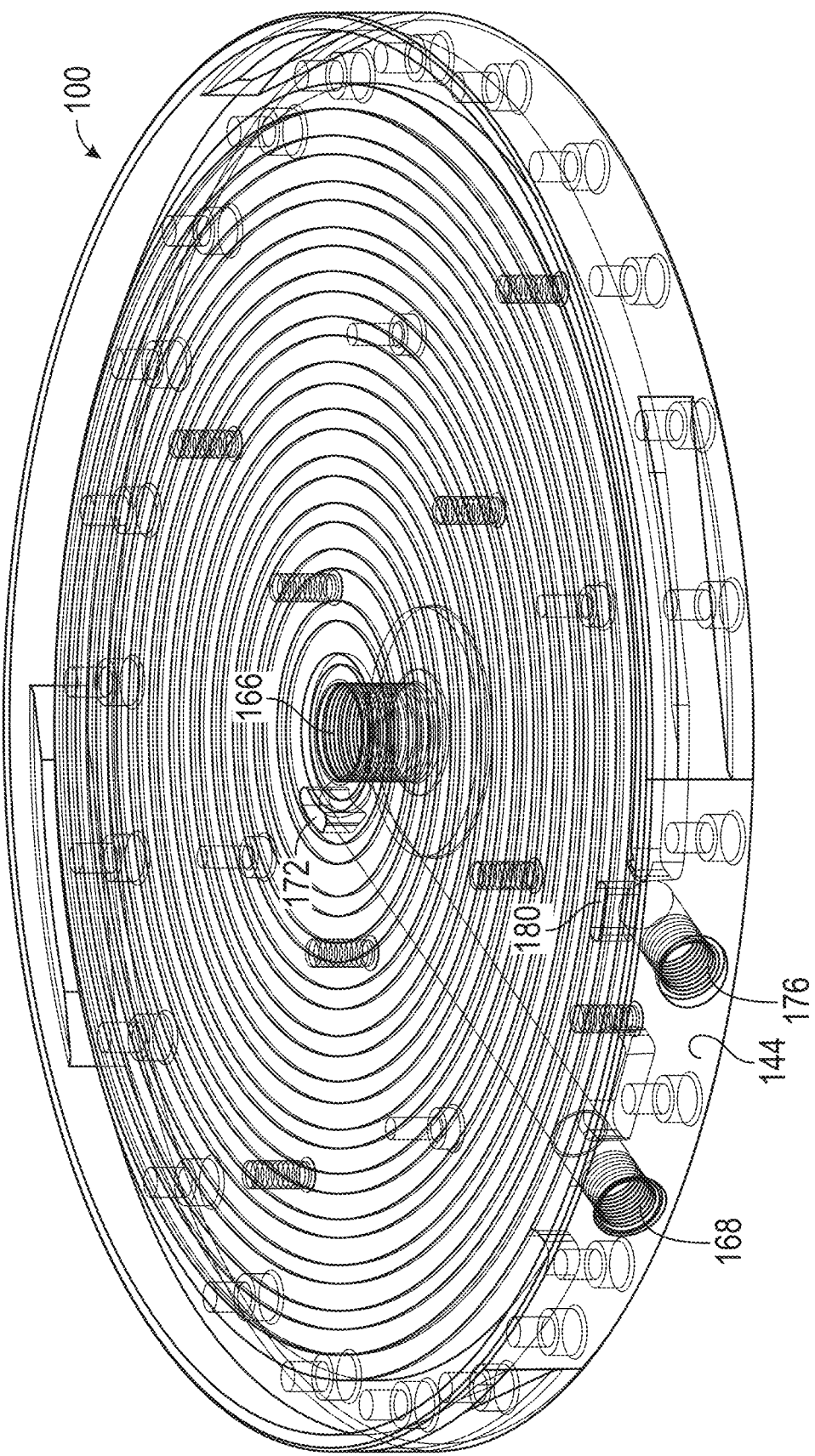
FIG. 20 is a partial transparent view of the base circular-shaped plate of FIG. 19.

Referring to FIGS. 14, 19 and 20, the center aperture 166 is a threaded aperture and extends through the base circular-shaped plate 100 from the primary surface 140 to the back surface 148. The center aperture 166 is provided to receive the threaded bolt 116 therein to secure the base circular-shaped plate 100 to the contacting circular-shaped plate 112.

Figure 18:
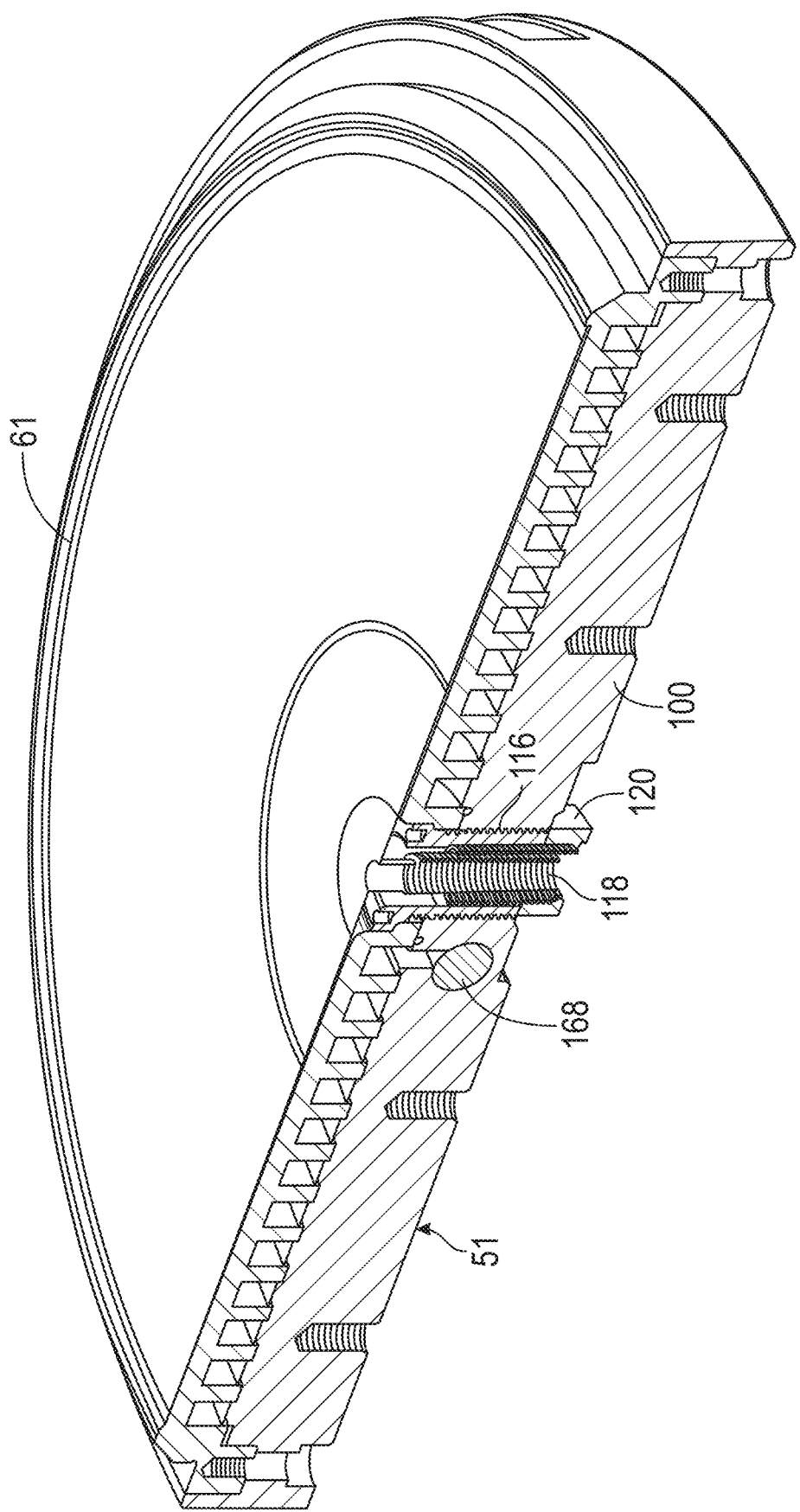
FIG. 18 is a partial cut-through view of the first die assembly of FIG. 1 taken along lines 18-18 in FIG. 1.

Referring to FIGS. 14 and 18, the inlet aperture 168 extends from an outer peripheral surface 144 into the base circular-shaped plate 100 to a central region 184 of the base circular-shaped plate 100. The inlet aperture 168 communicates with the first vertical aperture 172 that extends through the central region 184 from an end of the inlet aperture 168 and through the primary surface 140. The inlet aperture 168 fluidly communicates with the plurality of concentric channels 416.

Referring to FIG. 20, the outlet aperture 176 extends from the outer peripheral surface 144 into the base circular-shaped plate 100. The outlet aperture 176 communicates with a second vertical aperture 180 that extends from an end of the outlet aperture 176 and through the primary surface 140. The outlet aperture 176 fluidly communicates with the plurality of concentric channels 416. The second vertical aperture 180 communicates with the radially outermost concentric channel of the plurality of concentric channels 416.

Figure 15:
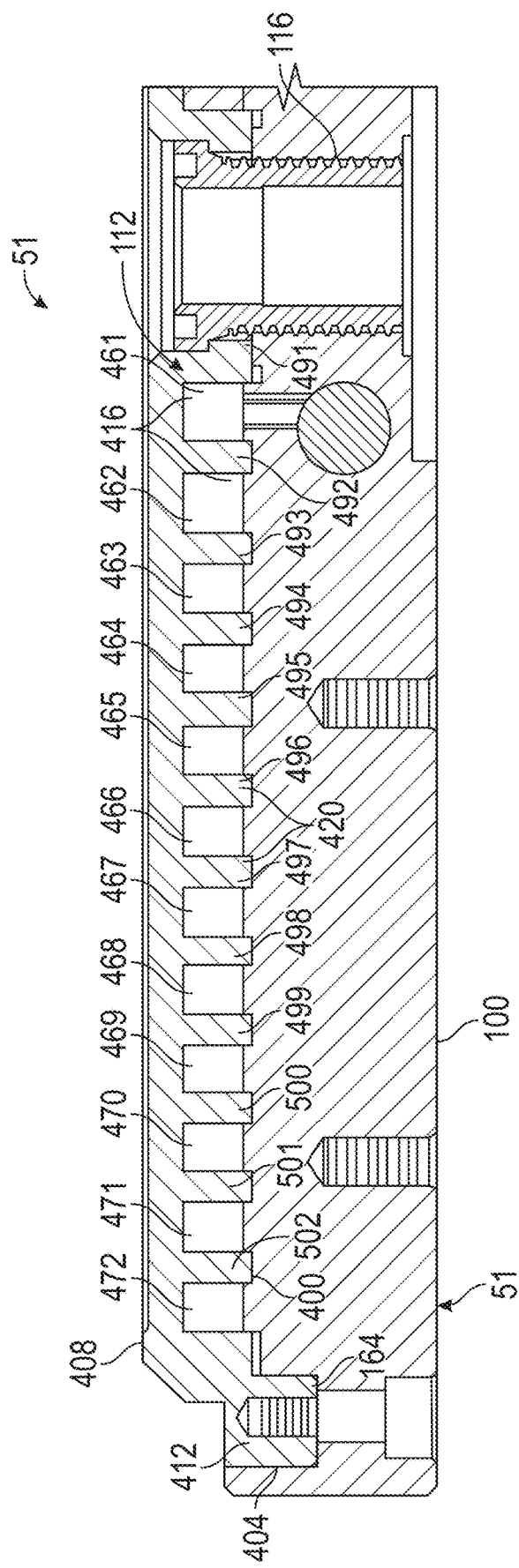
FIG. 15 is an enlarged view of a portion of the first die assembly of FIG. 14.

Referring to FIGS. 15, 16 and 19, the central region 184 is disposed between the inner O-ring groove 156 and the radially concentric groove 222 of the plurality of concentric grooves 160.

Figure 9:
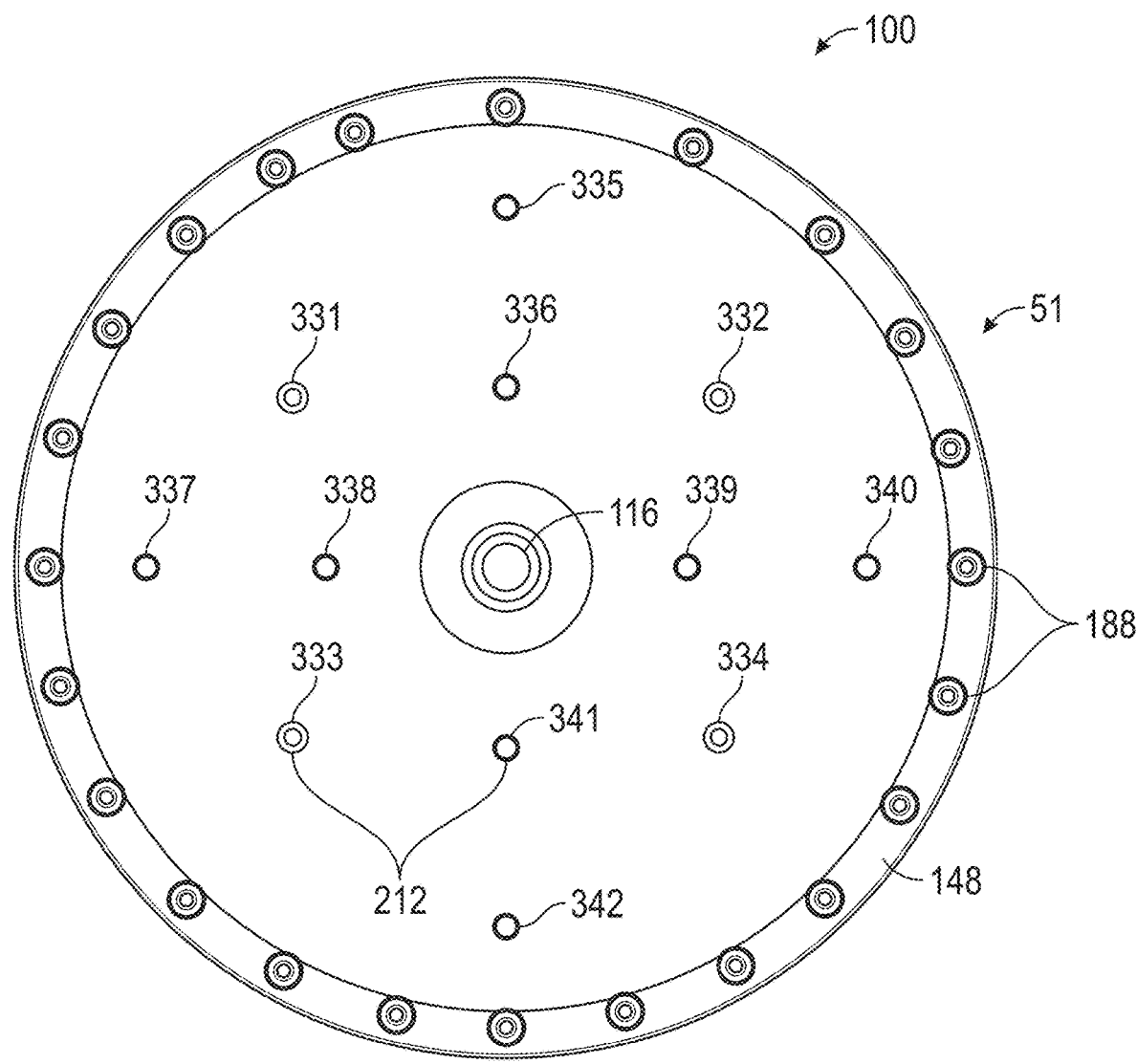
FIG. 9 is a bottom view of first die assembly of FIG. 1.
Figure 10:
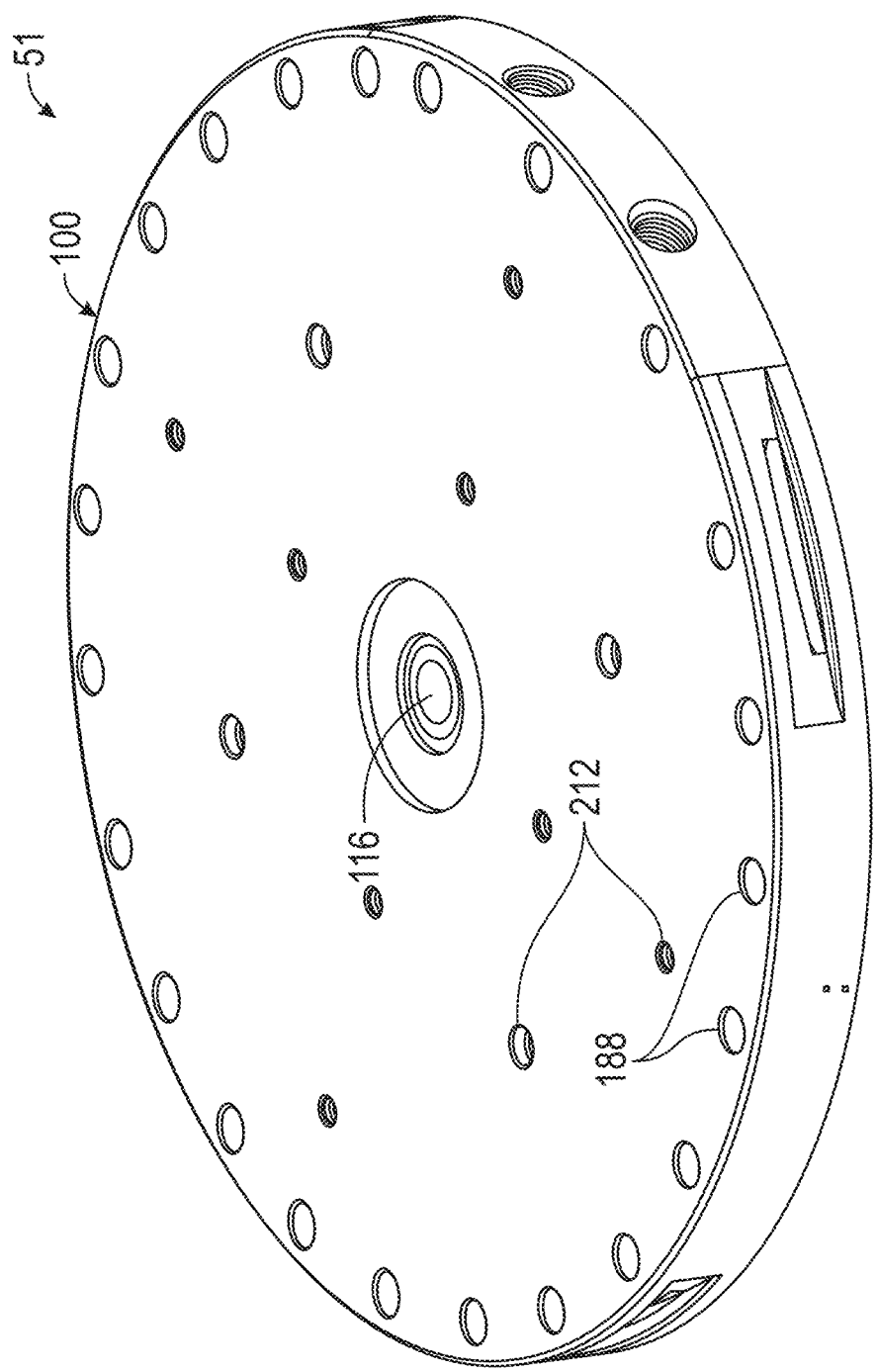
FIG. 10 is another isometric view of the first die assembly of FIG. 6.
Figure 11:
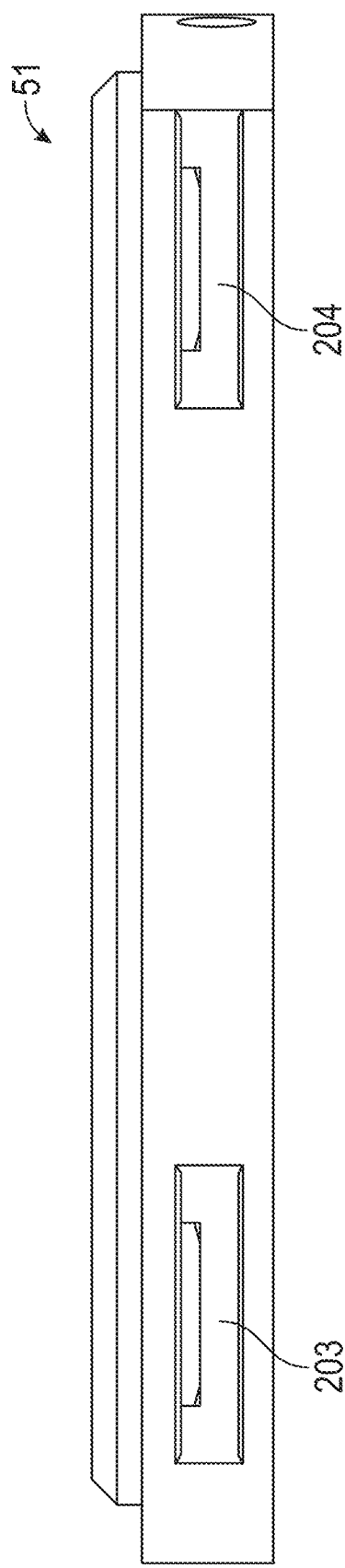
FIG. 11 is a side view of the first die assembly of FIG. 6.
Figure 12:
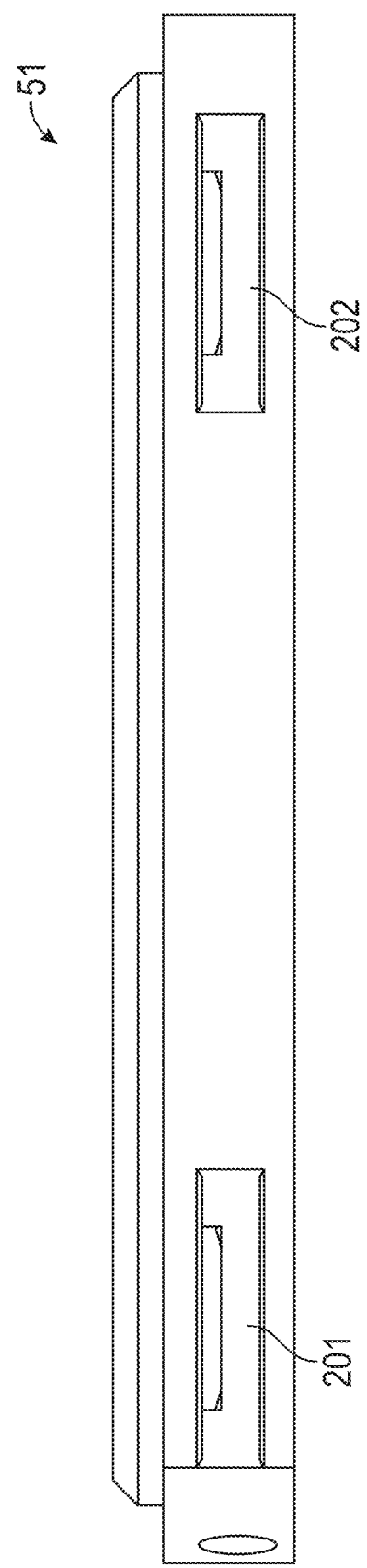
FIG. 12 is another side view of the first die assembly of FIG. 6.
Figure 13:
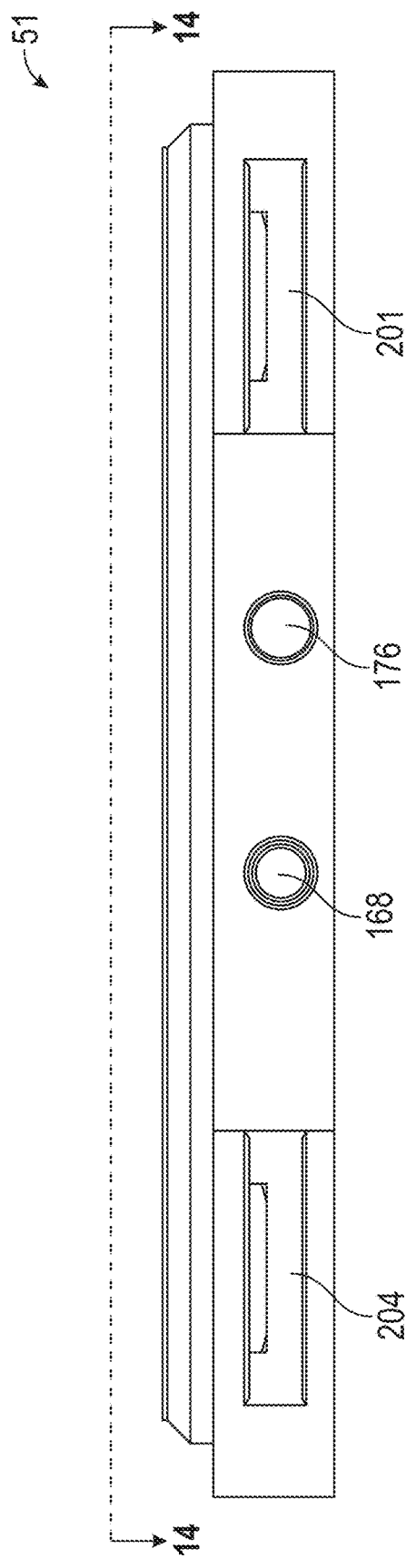
FIG. 13 is another side view of the first die assembly of FIG. 6.

Referring to FIGS. 9, 10 and 21, the plurality of peripheral bolt apertures 188 extend through the base circular-shaped plate 100. The plurality of peripheral bolt apertures 188 are disposed radially outwardly from the outer ring-shaped gasket groove 152 (shown in FIG. 14). The plurality of peripheral bolt apertures 188 include peripheral bolt apertures 251, 252, 253, 254, 255, 256, 257, 258, 259, 260, 261, 262, 263, 264, 265, 266, 267, 268, 269, 270, 271, 272, 273.

Referring to FIGS. 11-13 and 19, the first, second, third, and fourth clamping grooves 201, 202, 203, 204 are disposed from the outer peripheral surface 144 into the base circular-shaped plate 100.

Referring to FIGS. 9 and 10, the plurality of inner bolt apertures 212 extend from the back surface 148 into the base circular-shaped plate 100. The plurality of inner bolt apertures 212 are provided to allow the base circular-shaped plate 100 to be coupled to the actuator 81 (shown in FIG. 1). The plurality of inner bolt apertures 212 include inner bolt apertures 331, 332, 333, 334, 335, 336, 337, 338, 339, 340, 341, 342.

Referring to FIGS. 15 and 23-31, the contacting circular-shaped plate 112 is provided to be coupled to the base circular-shaped plate 100. The contacting circular-shaped plate 112 includes an engagement surface 400 (shown in FIG. 15), an outer peripheral surface 404, a stamper plate holding surface 408, a ring-shaped placement member 412, a plurality of concentric channels 416, a plurality of concentric finger portions 420, a plurality of radial passages 424 (shown in FIGS. 29 and 30), a plurality of peripheral bolt holes 428 (shown in FIG. 28), a center aperture 432, and first, second, third, and fourth clamping grooves 441, 442, 443, 444. In an exemplary embodiment, the contacting circular-shaped plate 112 is constructed of steel.

Figure 24:
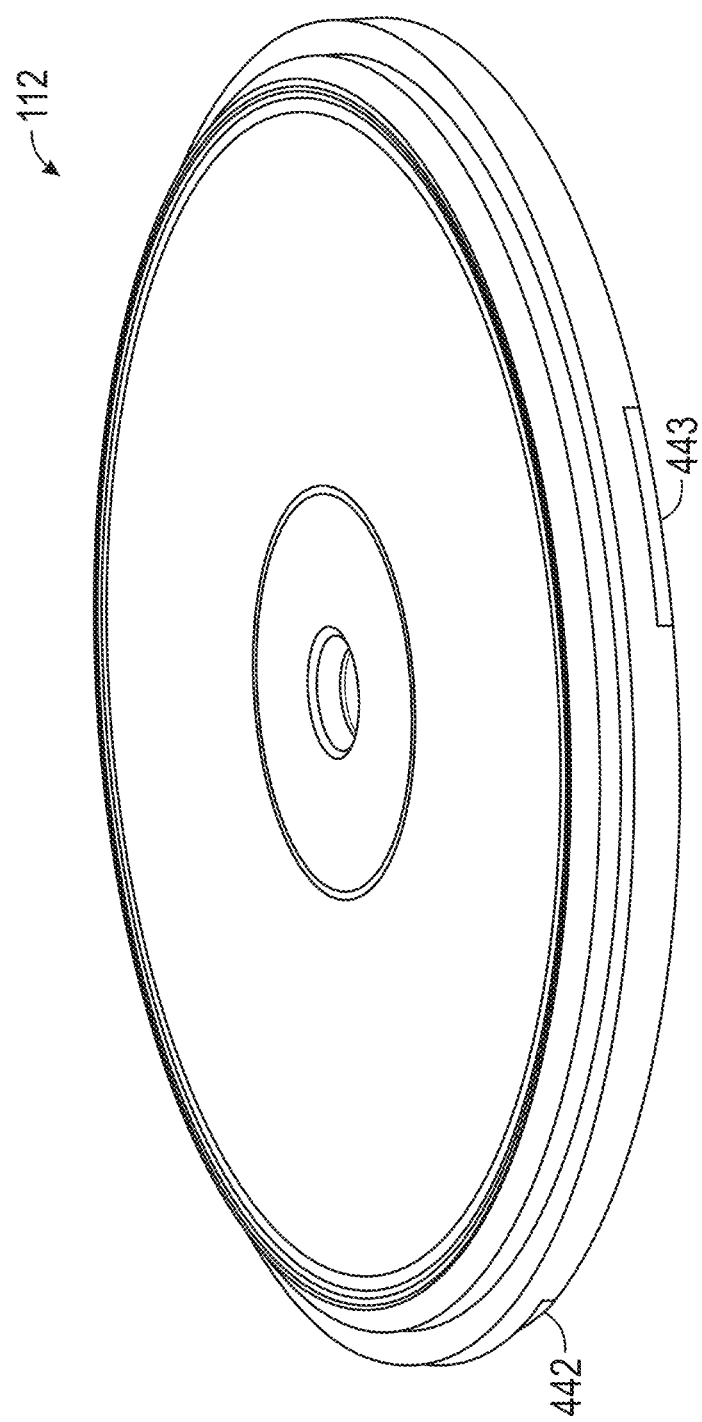
FIG. 24 is another isometric view of the contacting circular-shaped plate of FIG. 23.
Figure 27:
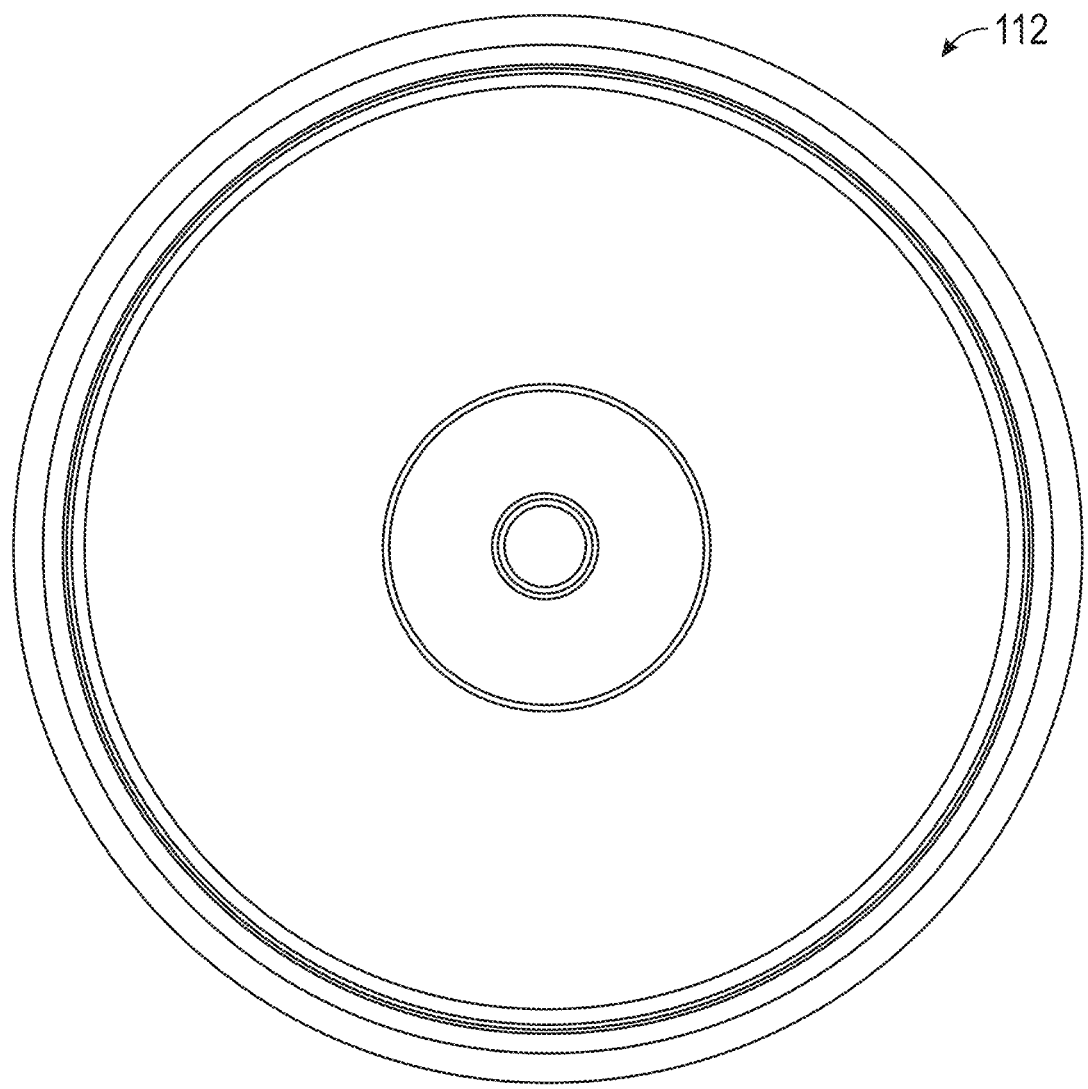
FIG. 27 is a top view of the contacting circular-shaped plate of FIG. 23.
Figure 29:
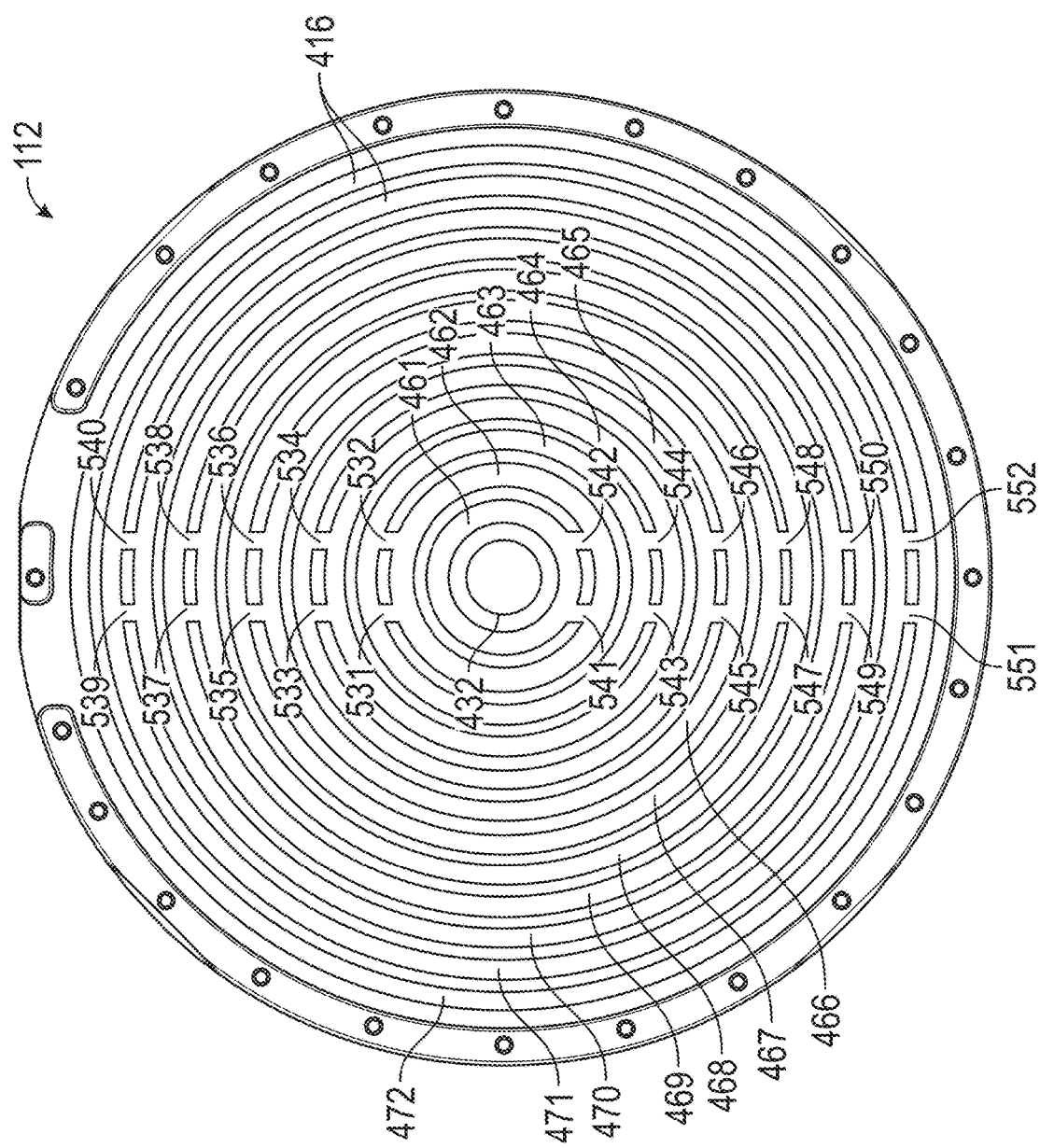
FIG. 29 is a bottom view of the contacting circular-shaped plate of FIG. 23.
Figure 30:
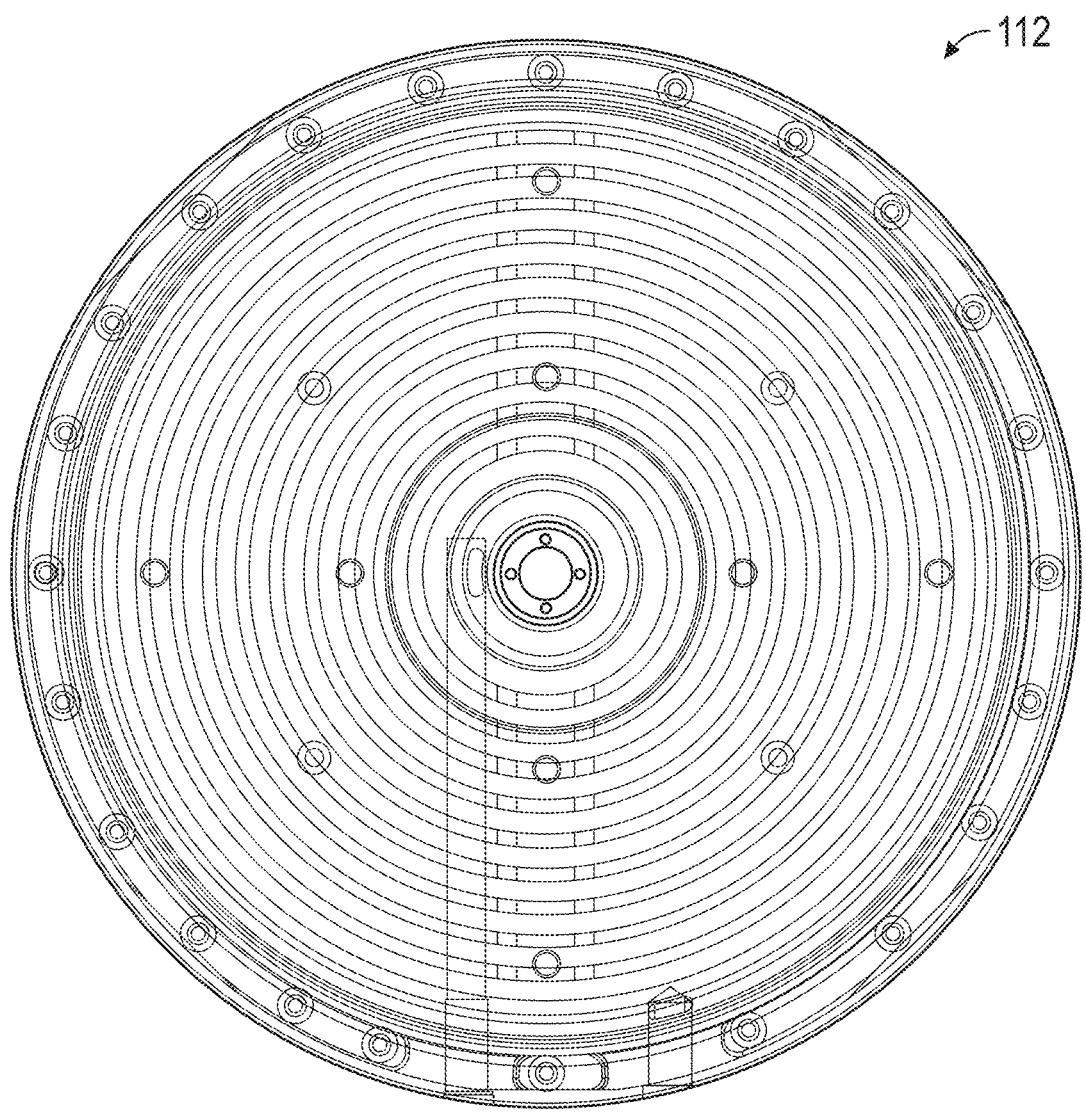
FIG. 30 is a partially transparent view of the contacting circular-shaped plate of FIG. 23 disposed on the base circular-shaped plate of FIG. 19.
Figure 31:
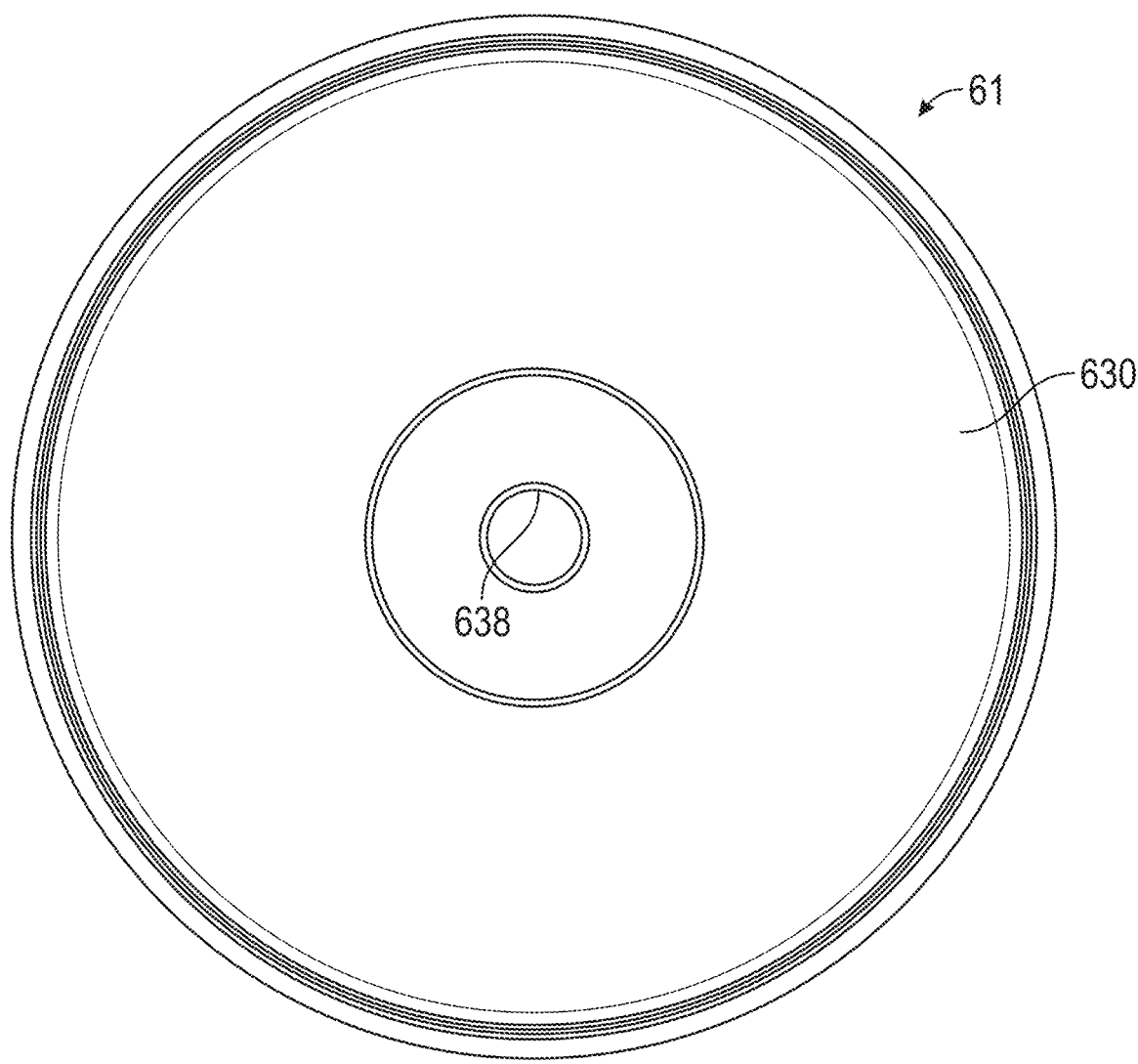
FIG. 31 is a top view of a first stamper plate utilized in the vinyl record manufacturing system of FIG. 1.
Figure 32:
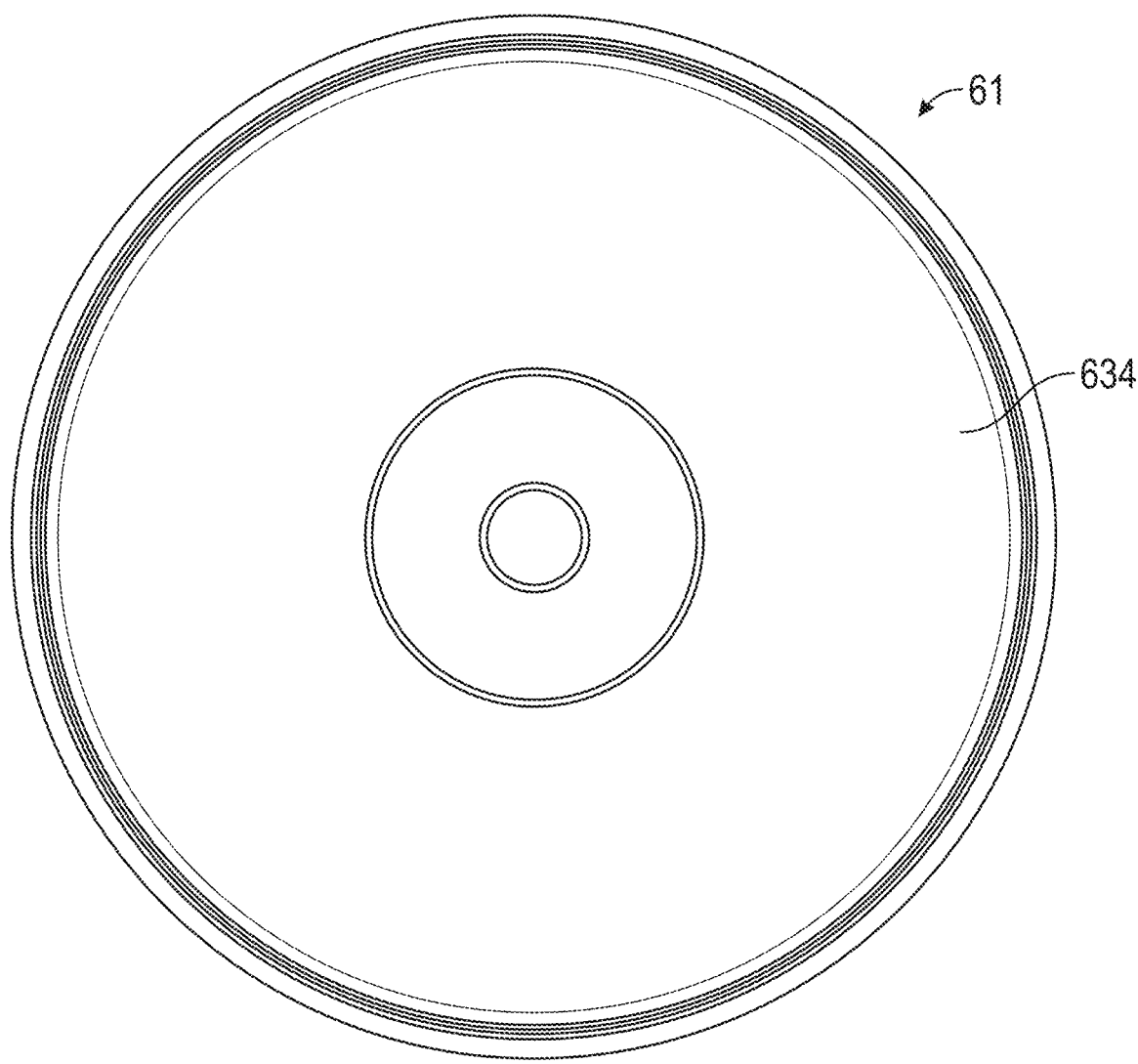
FIG. 32 is a bottom view of the first stamper plate of FIG. 31.
Figure 33:
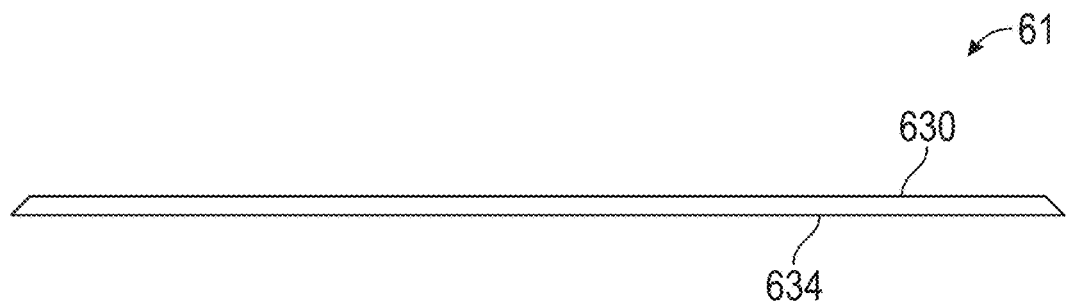
FIG. 33 is a side view of the first stamper plate of FIG. 31.

Referring to FIGS. 15, 24 and 29, the engagement surface 400 and the stamper plate holding surface 408 are disposed opposite to and substantially parallel to one another. Further, the outer peripheral surface 404 extends perpendicular to and between the engagement surface 400 and the stamper plate holding surface 408.

Figure 28:
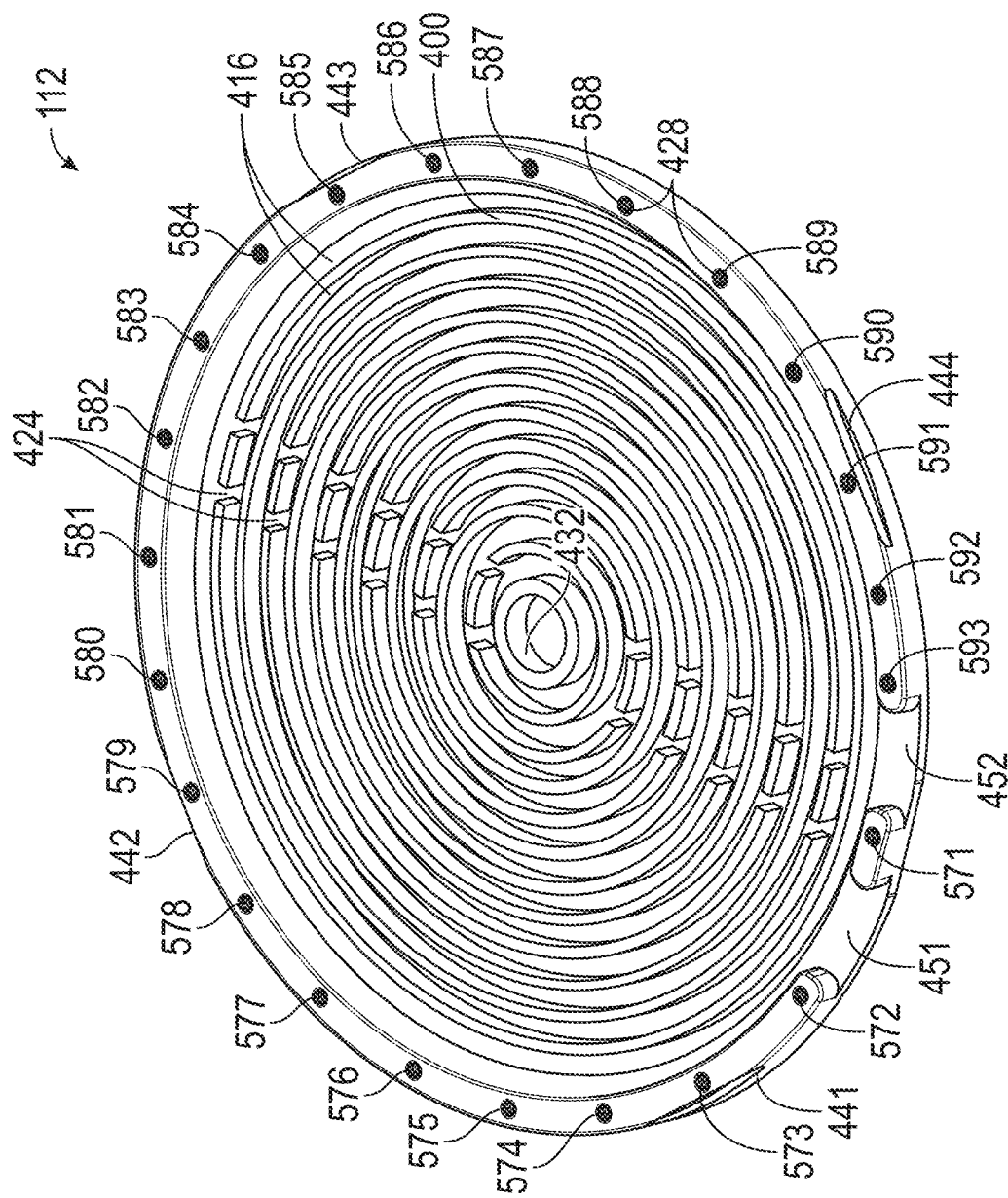
FIG. 28 is another isometric view of the contacting circular-shaped plate of FIG. 23.

Referring to FIGS. 14, 15 and 28, the ring-shaped placement member 412 extends outwardly from the engagement surface 400 and around an outer periphery of the engagement surface 400. The ring-shaped placement member 412 is received in the ring-shaped placement groove 164 of the base circular-shaped plate 100. The ring-shaped placement member 412 has first and second cut-out regions 451, 452 extending therethrough.

Referring to FIGS. 15, 16, 28 and 29, the plurality of concentric channels 416 extend from the engagement surface 400 into the contacting circular-shaped plate 112 such that a plurality of concentric finger portions 420 (shown in FIG. 15) are formed on the contacting circular-shaped plate 112. The plurality of concentric channels 416 includes concentric channels 461, 462, 463, 464, 465, 466, 467, 468, 469, 470, 471, 472. The plurality of concentric finger portions 420 includes concentric finger portions 491, 492, 493, 494, 495, 496, 497, 498, 499, 500, 501, 502. Each of the concentric finger portions 492, 493, 494, 495, 496, 497, 498, 499, 500, 501, 502 are disposed between two concentric channels of the plurality of concentric channels 416. The concentric finger portions 491, 492, 493, 494, 495, 496, 497, 498, 499, 500, 501, 502 of the contacting circular-shaped plate 100 are disposed in the concentric grooves 221, 222, 223, 224, 225, 226, 227, 228, 229, 230, 231, 232, respectively in the base circular-shaped plate 100.

Referring to FIGS. 28 and 29, the plurality of radial passages 424 extend from the engagement surface 400 (shown in FIG. 15) into the contacting circular-shaped plate 112. The plurality radial passages 424 includes radial passages 531, 532, 533, 534, 535, 536, 537, 538, 539, 540, 541, 542, 543, 544, 545, 546, 547, 548, 549, 550, 551, 552 which fluidly interconnecting the plurality of concentric channels 416.

As discussed briefly above, referring to FIGS. 15, 16, 18, 28 and 29, the contacting circular-shaped plate 112 is disposed on the base circular-shaped plate 100 such that the plurality of concentric finger portions 420 are partially disposed in the plurality of concentric grooves 160 and contact the base circular-shaped plate 100, and a flow path is formed by and through the inlet aperture 168, the first vertical aperture 172, the plurality of concentric channels 416, the plurality of radial passages 424, the second vertical aperture 180, and the outlet aperture 176. During operation, when heating the first die assembly 51, steam flows through the flow path to heat the first die assembly 51. Further, when cooling the first die assembly 51, a cooling fluid flows through the flow path to cool the first die assembly 51.

Figure 22:
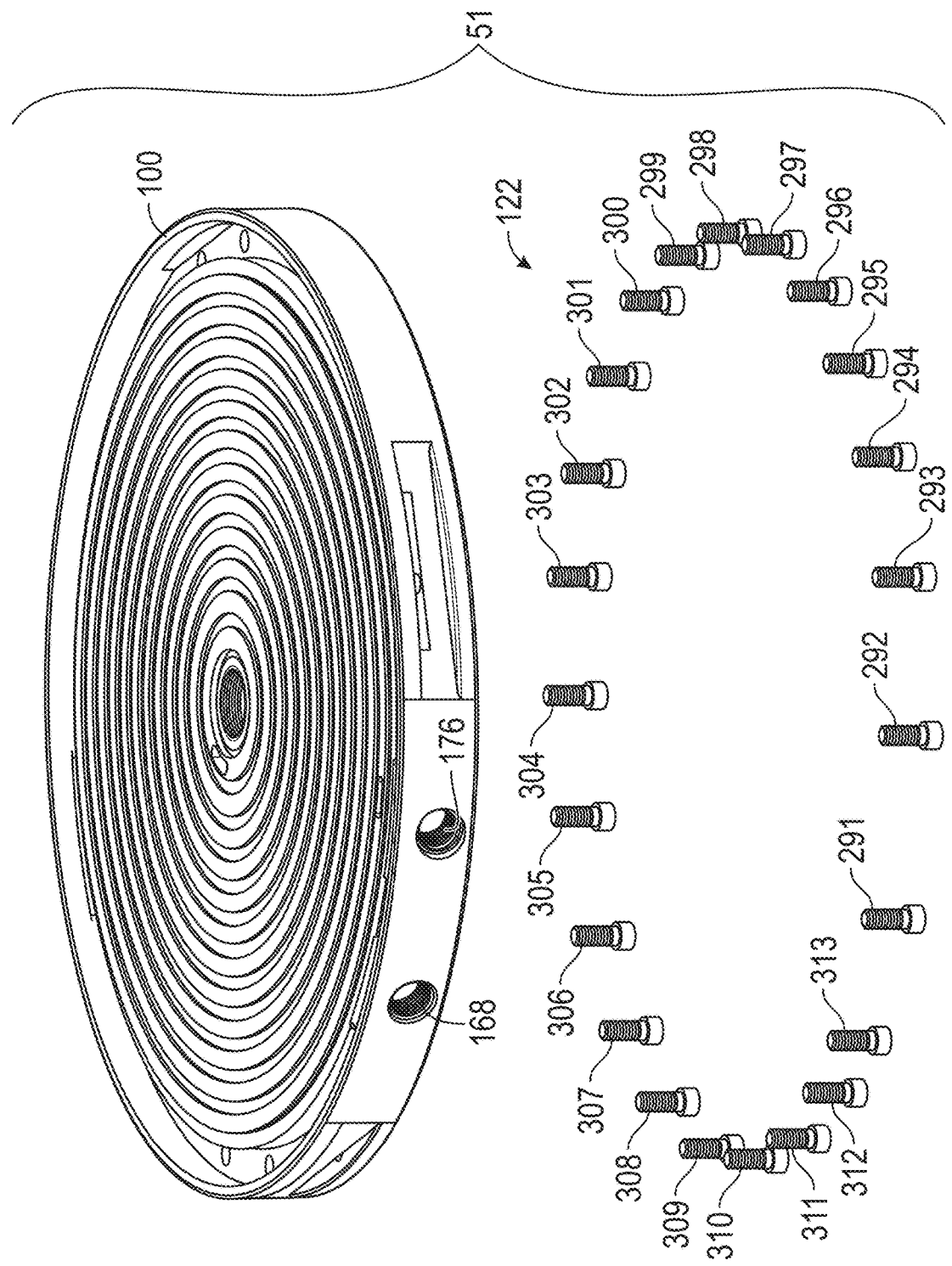
FIG. 22 is an isometric view of the base circular-shaped plate of FIG. 19 and a plurality of peripheral bolts utilizing therein.
Figure 23:
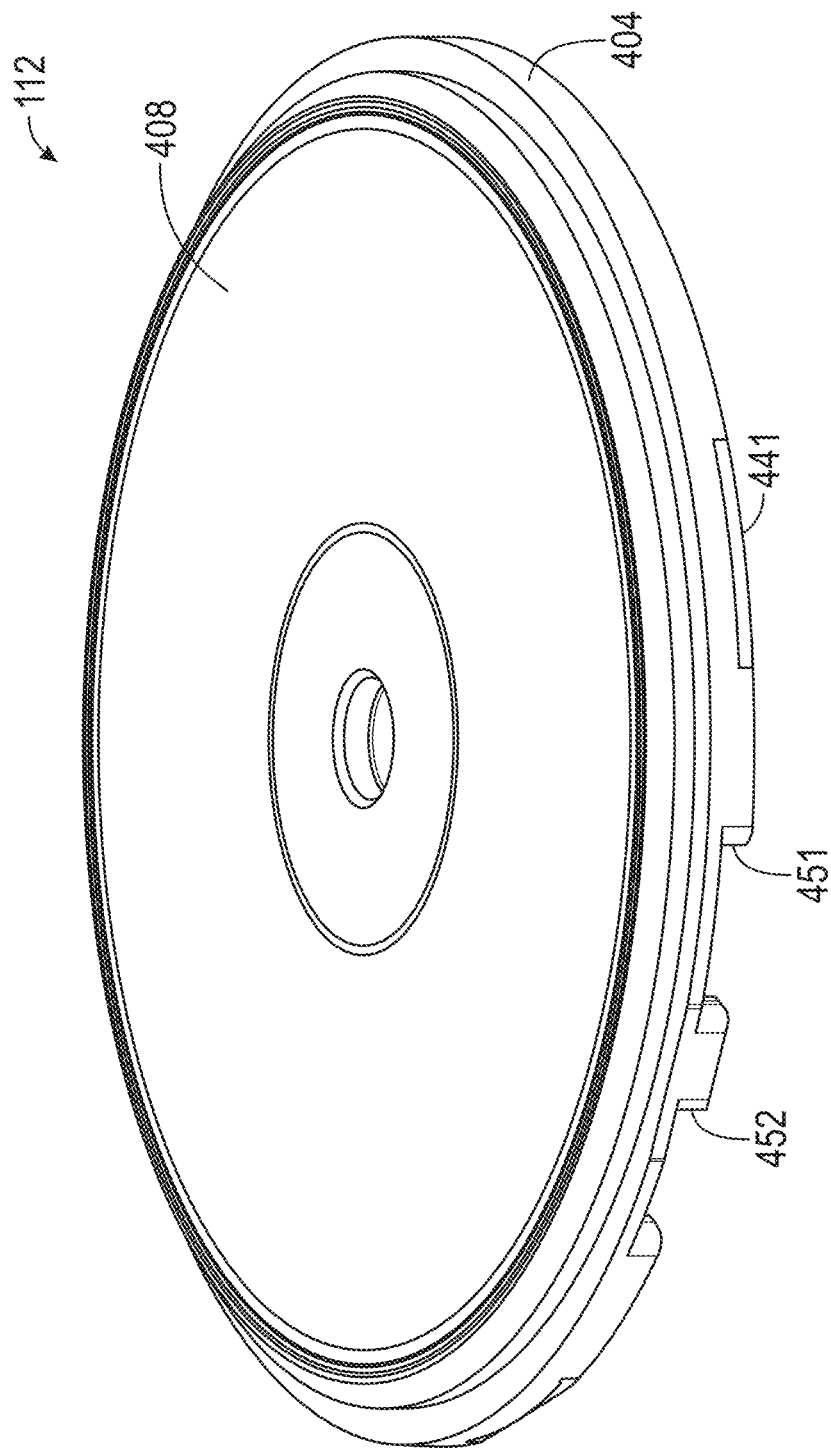
FIG. 23 is an isometric view of a contacting circular-shaped plate utilized in the first die assembly of FIG. 6.

Referring to FIGS. 22, 28 and 29, the plurality of peripheral bolt holes 428 extend from the engagement surface 400 (shown in FIG. 14) into the contacting circular-shaped plate 112. The plurality of peripheral bolt holes 428 are disposed radially outwardly from the plurality of concentric channels 416. The plurality of peripheral bolt holes 428 include peripheral bolt holes 571, 572, 573, 574, 575, 576, 577, 578, 579, 580, 581, 582, 583, 584, 585, 586, 537, 588, 589, 590, 591, 592, 593. The bolts 291, 292, 293, 294, 295, 296, 297, 298, 299, 300, 301, 302, 303, 304, 305, 306, 307, 308, 309, 310, 311, 312, 313 extend through the peripheral bolt hole apertures 251, 252, 253, 254, 255, 256, 257, 258, 259, 260, 261, 262, 263, 264, 265, 266, 267, 268, 269, 270, 271, 272, 273, respectively, of the base circular-shaped plate 100 and into the peripheral bolt holes 571, 572, 573, 574, 575, 576, 577, 578, 579, 580, 581, 582, 583, 584, 585, 586, 537, 588, 589, 590, 591, 592, 593, respectively, of the contacting circular-shaped plate 112—to couple the base circular-shaped plate 100 to the contacting circular-shaped plate 112.

Referring to FIG. 29, the center aperture 432 extends through the contacting circular-shaped plate 112. The center aperture 432 aligns with the center aperture 166 (shown in FIG. 19) of the base circular-shaped plate 100 when the contacting circular-shaped plate 112 is disposed on the base circular-shaped plate 100. Referring to FIG. 14, the threaded bolt 116 is threadably received through the center apertures 432, 166 to couple the base circular-shaped plate 100 to the contacting circular-shaped plate 112.

Referring to FIGS. 23-26, the outer peripheral surface 404 of the contacting circular-shaped plate 112 has first, second, third, and fourth clamping grooves 441, 442, 443, 444 disposed therein. The first, second, third, and fourth clamping grooves 441, 442, 443, 444 align with the first, second, third, and fourth clamping grooves 201, 202, 203, 204 (shown in FIGS. 11-13) when the base circular-shaped plate 100 is coupled to the contacting circular-shaped plate 112.

Referring to FIGS. 14 and 21, the O-ring 108 is disposed in the inner O-ring groove 156 of the base circular-shaped plate 100. Further, the O-ring 108 is compressed by the finger portion 221 (shown in FIG. 16) when the contacting circular-shaped plate 112 is disposed on the base circular-shaped plate 100.

The outer ring-shaped gasket 104 is disposed in the outer ring-shaped gasket groove 152 of the base circular-shaped plate 100. Further, the outer ring-shaped gasket 104 is compressed by the contacting circular-shaped plate 112 when the contacting circular-shaped plate 112 is disposed on the base circular-shaped plate 100.

Referring to FIGS. 5 and 14, the center bushing 118 extends through the center aperture 638 of the first stamper plate 61, the center aperture 600 of the threaded bolt 116, and the center aperture 166 of the base circular-shaped plate 100 and is threadably coupled to the nut 120 to couple the first stamper plate 61 to the contacting circular-shaped plate 112. Alternately, the base circular-shaped plate 100 is coupled to the contacting circular-shaped plate 112 utilizing a slotted bar that is integrally coupled to the system 20.

Referring to FIGS. 1, 4 and 31-33, the first stamper plate 61 is removably coupled to the first die assembly 51. The first stamper plate 61 includes a polymeric puck contacting surface 630 and a die assembly contacting surface 634. The polymeric puck contacting surface 630 is disposed opposite to the die assembly contacting surface 634. The first stamper plate 61 further includes a center aperture 638 extending therethrough. The polymeric puck contacting surface 630 has ridges disposed thereon corresponding to a musical composition that is imprinted on a first side of the vinyl record 28. In an exemplary embodiment, the first stamper plate 61 is constructed of a coated metal.

Figure 2:
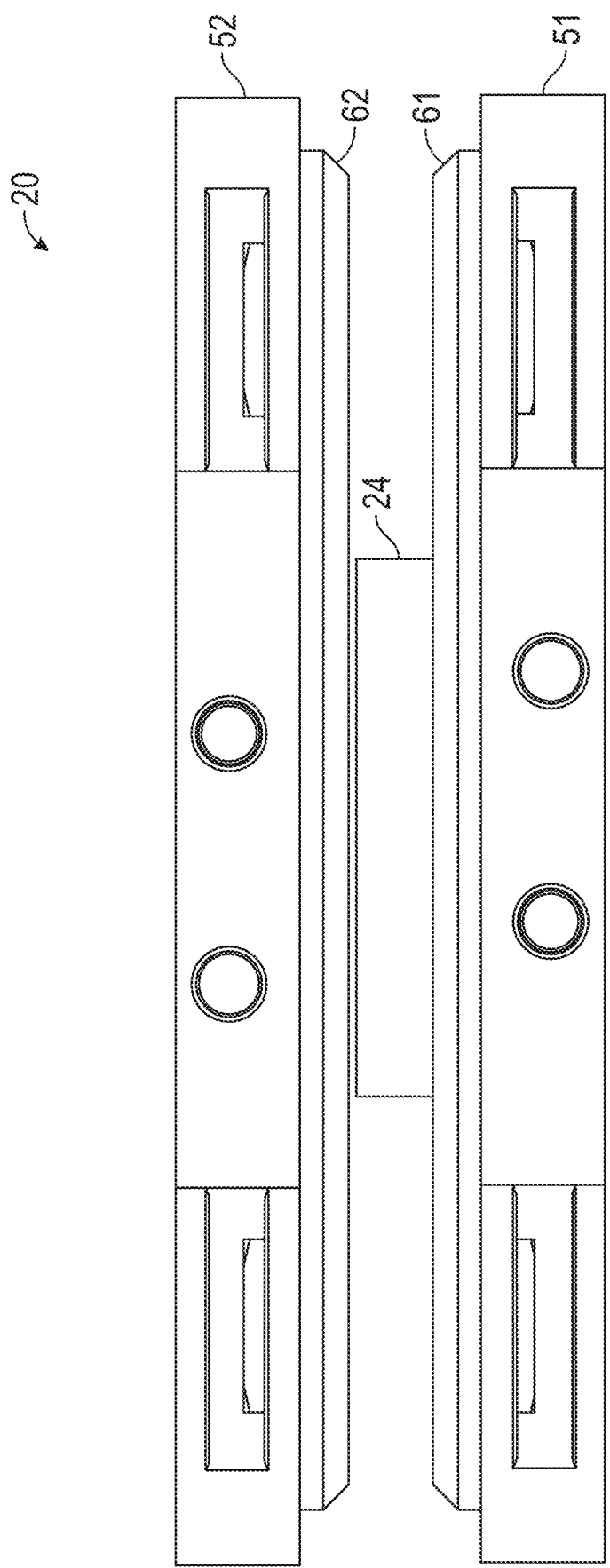
FIG. 2 is a side view of the first and second dies assemblies and the first and second stamper plates of FIG. 1 and a polymeric puck prior to the puck being compressed.
Figure 3:
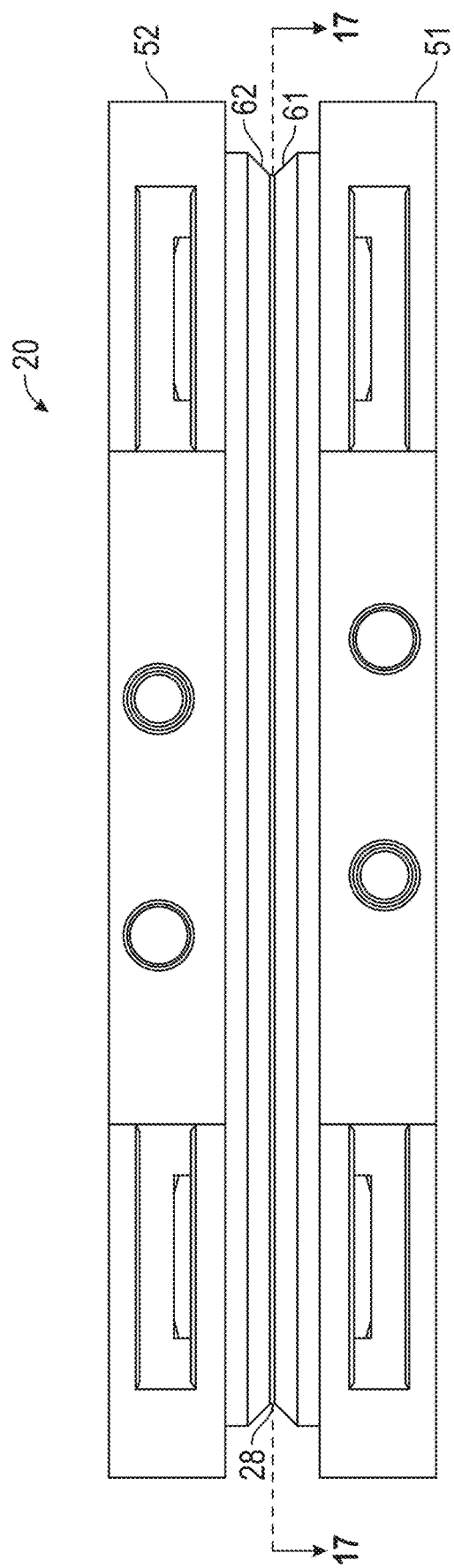
FIG. 3 is a side view of the first and second dies assemblies and the first and second stamper plates of FIG. 2 and the polymeric puck after the puck is compressed into a vinyl record.
Figure 4:
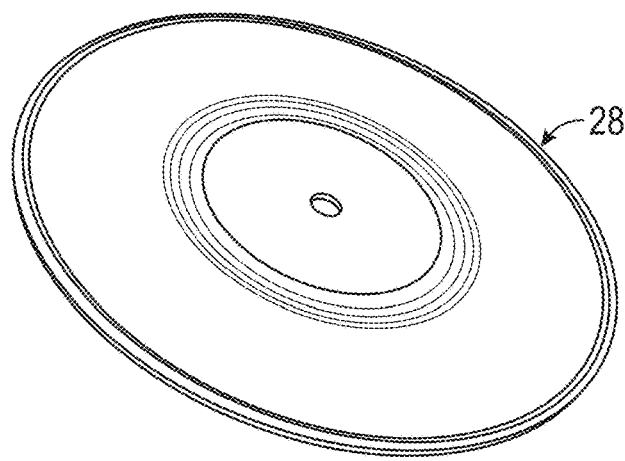
FIG. 4 is an isometric view of a vinyl record.

Referring to FIGS. 1-3, the second die assembly 52 has an identical structure as the first die assembly 51. The second die assembly 52 includes an inlet aperture 652 and an outlet aperture 654.

Figure 34:
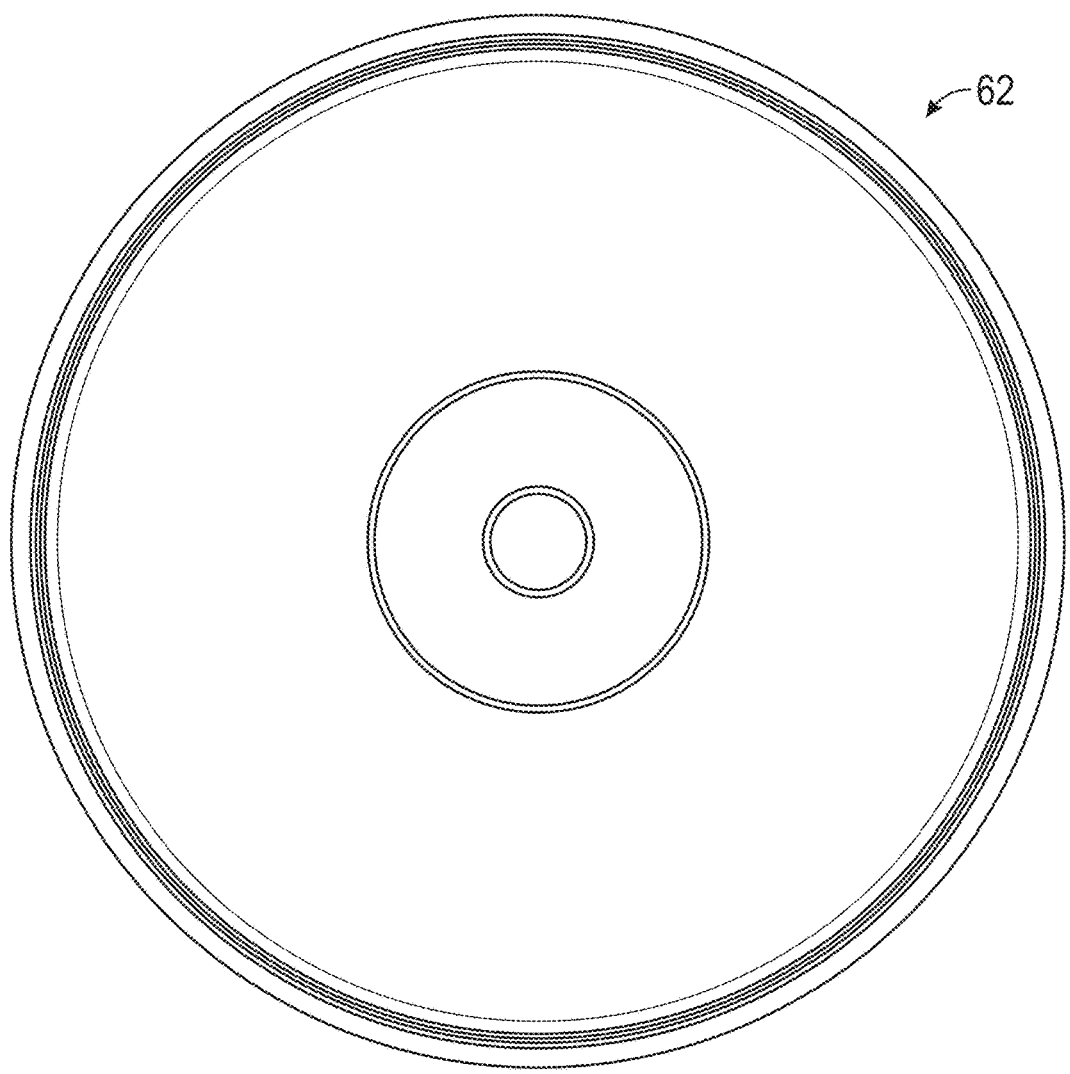
FIG. 34 is a top view of a second stamper plate utilized in the vinyl record manufacturing system of FIG. 1.

Referring to FIGS. 1 and 34, the second stamper plate 62 is provided to be removably coupled to the second die assembly 52. The second stamper plate 62 has a substantially structure as the first stamper plate 61. The only difference between the second stamper plate 62 and the first stamper plate 61 is that the second stamper plate 62 has a polymeric puck contacting surface having ridges disposed thereon corresponding to another musical composition that is imprinted on a second side of the vinyl record 28. The second stamper plate 62 is removably coupled to the second die assembly 52 in an identical fashion as the first stamper plate 61 is removably coupled to the first die assembly 51.

Referring to FIG. 1, the remaining components of the vinyl record manufacturing system 20 will now be explained.

The heating system 66 is provided to heat the die assemblies 51, 52 such that polymeric puck 24 (shown in FIG. 2) is compressible and in printable between the die assemblies 51, 52. The heating system 66 is fluidly coupled to the inlet aperture 168 and the outlet aperture 176 of the first die assembly 51. Further, the heating system 66 is fluidly coupled to the inlet aperture 652 and the outlet aperture 654 of the second die assembly 52. During operation, the heating system 66 pumps steam through the flow path of the first die assembly 51 including the inlet aperture 168, the first vertical aperture 172, the plurality of concentric channels 416, the plurality of radial passages 424, the second vertical aperture 180, and the outlet aperture 176. The heating system 66 pumps the steam through the flow path of the first die assembly 51 in response to a control signal received from the machine controller 86. Further, the heating system 66 pumps steam through the flow path of the second die assembly 52 in response to the control signal received from the machine controller 86.

The cooling system 70 is provided to cool the die assemblies 51, 52 such that vinyl record 28 can be removed from the die assemblies 51, 52. The cooling system 70 is fluidly coupled to the inlet aperture 168 and the outlet aperture 176 of the first die assembly 51. Further, the cooling system 70 is fluidly coupled to the inlet aperture 652 and the outlet aperture 654 of the second die assembly 52. During operation, the cooling system 70 pumps a cooled fluid through the flow path of the first die assembly 51 including the inlet aperture 168, the first vertical aperture 172, the plurality of concentric channels 416, the plurality of radial passages 424, the second vertical aperture 180, and the outlet aperture 176. The heating system 66 pumps the steam through the flow path of the first die assembly 51 in response to a control signal received from the machine controller 86. Further, the cooling system 70 pumps a cooled fluid through the flow path of the second die assembly 52 in response to the control signal received from the machine controller 86.

The actuator 81 is operably coupled to the first die assembly 51. The actuator 81 moves the first die assembly 51 in a first direction (upwardly in FIG. 1) in response to a control signal from the machine controller 86. Further, the actuator 81 moves the first die assembly 51 in a second direction (downwardly in FIG. 1) in response to another control signal from the machine controller 86. The second die assembly 52 is held at a fixed position.

The machine controller 86 is provided to control operation of the vinyl record manufacturing system 20. The machine controller 86 is operably coupled to the heating system 66, the cooling system 70, and the actuator 81. The machine controller 86 executes software instructions to control operation of the heating system 66, the cooling system 70, and the actuator 81 to transform the polymeric puck 24 into the vinyl record 28.

Figure 36:
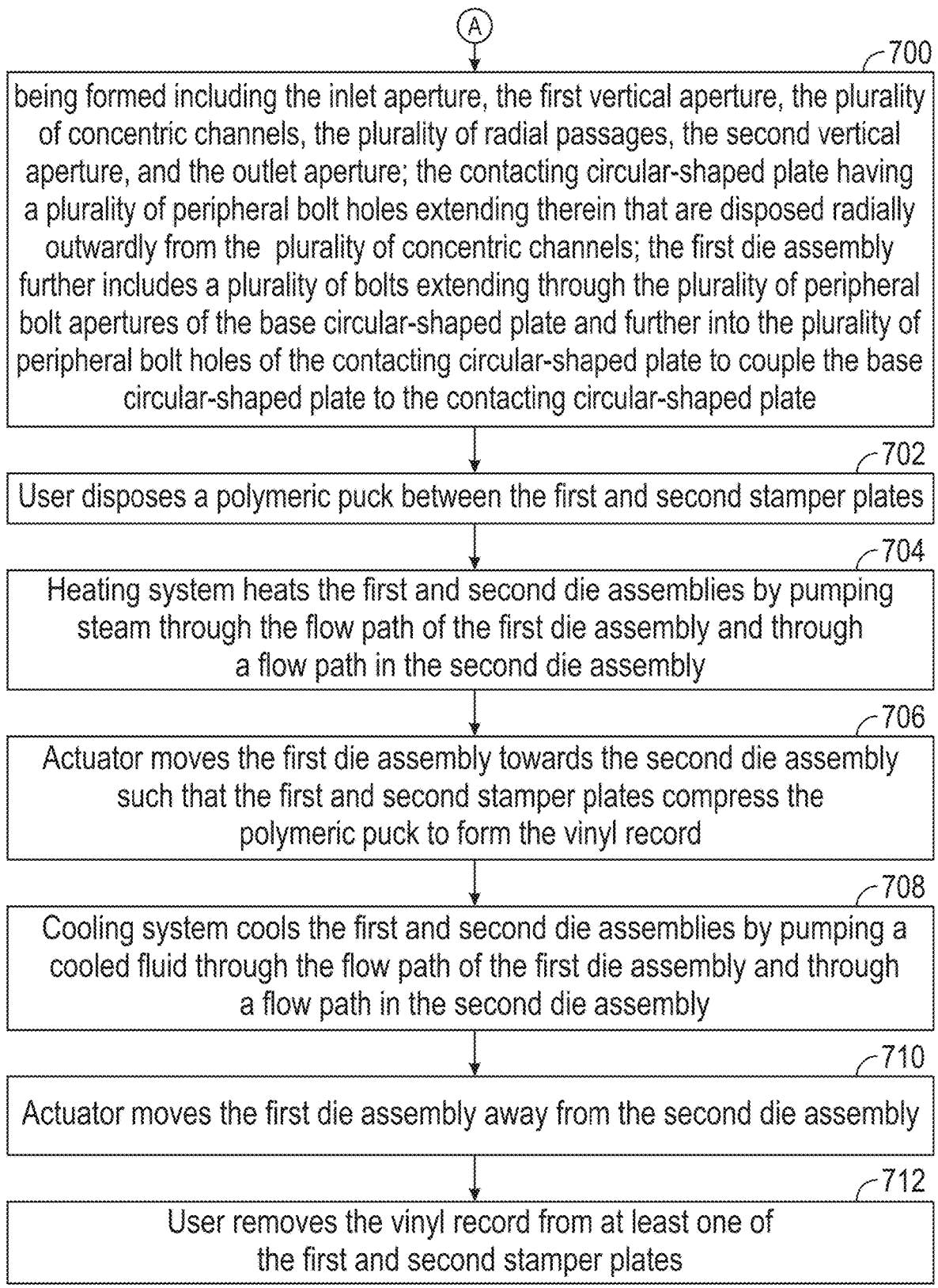

Referring to FIGS. 1 and 35-36, a flowchart of a method for forming the vinyl record 28 utilizing the vinyl record manufacturing system 20 in accordance with another exemplary embodiment will now be explained.

At step 700, a user provides a vinyl record manufacturing system 20 (shown in FIG. 1) having a first die assembly 51, a second die assembly 52, a first stamper plate 61 coupled to the first die assembly 51, and a second stamper plate 62 coupled to the second die assembly 52, a heating system 66, a cooling system 70, and at least one actuator 81. The first die assembly 51 includes a base circular-shaped plate 100 (shown in FIGS. 14-13) having a primary surface 140 and an outer ring-shaped gasket groove 152, an inner O-ring groove 156, and a plurality of concentric grooves 160 extending from the primary surface 140 into the base circular-shaped plate 100. The plurality of concentric grooves 160 are disposed between the outer ring-shaped gasket groove 152 and the inner O-ring groove 156. The base circular-shaped plate 100 having an inlet aperture 168 extending from an outer peripheral surface 144 thereof into the base circular-shaped plate 100 to a central region 184 of the base circular-shaped plate 100. The inlet aperture 168 communicates with a first vertical aperture 172 that extends from an end of the inlet aperture 168 and through the primary surface 140. The base circular-shaped plate 100 has an outlet aperture 176 extending from the outer peripheral surface 144 into the base circular-shaped plate 100. The outlet aperture 176 communicates with a second vertical aperture 180 that extends from an end of the outlet aperture 176 and through the primary surface 140. The base circular-shaped plate 100 having a plurality of peripheral bolt apertures 188 extending therethrough that are disposed radially outwardly from the outer ring-shaped gasket groove 152. The first die assembly 51 further includes an outer ring-shaped gasket 105 (shown in FIG. 14) disposed in the outer ring-shaped gasket groove 152. The first die assembly 51 further includes an O-ring 108 (shown in FIGS. 5 and 14) that is disposed in the inner O-ring groove 156. The first die assembly 51 further includes a contacting circular-shaped plate 112 (shown in FIGS. 24-31) having an engagement surface 400 and a plurality of concentric channels 416 extending from the engagement surface 400 into the contacting circular-shaped plate 112 such that a plurality of concentric finger portions 420 are formed on the contacting circular-shaped plate 112. Each concentric finger portion is disposed between two concentric channels of the plurality of concentric channels 416. The contacting circular-shaped plate 112 has a plurality of radial passages 424 fluidly interconnecting the plurality of concentric channels 416. The contacting circular-shaped plate 112 is disposed on the base circular-shaped plate 100 such that the plurality of concentric finger portions 420 are partially disposed in the plurality of concentric grooves 160 and contact the base circular-shaped plate 100. The inlet aperture 168 fluidly communicates with the plurality of concentric channels 416. The outlet aperture 176 fluidly communicates with the plurality of concentric channels 416. A flow path is formed including the inlet aperture 168, the first vertical aperture 172, the plurality of concentric channels 416, the plurality of radial passages 424, the second vertical aperture 180, and the outlet aperture 176. The contacting circular-shaped plate 112 has a plurality of peripheral bolt holes 188 extending therein that are disposed radially outwardly from the plurality of concentric channels 416. The first die assembly 51 further includes a plurality of bolts 122 extending through the plurality of peripheral bolt apertures 188 of the base circular-shaped plate 100 and further into the plurality of peripheral bolt holes 428 of the contacting circular-shaped plate 112 to couple the base circular-shaped plate 100 to the contacting circular-shaped plate 112.

At step 702, the user disposes a polymeric puck 24 (shown in FIG. 2) between the first and second stamper plates 61, 62.

At step 704, the heating system 66 (shown in FIG. 1) heats the first and second die assemblies 51, 52 by pumping steam through the flow path of the first die assembly 51 and through a flow path in the second die assembly 52.

At step 706, the actuator 81 (shown in FIG. 1) moves the first die assembly 51 towards the second die assembly 52 such that the first and second stamper plates 61, 62 compress the polymeric puck 24 to form the vinyl record 28 (shown in FIG. 3).

At step 708, the cooling system 70 (shown in FIG. 1) cools the first and second die assemblies 51, 52 by pumping a cooled fluid through the flow path of the first die assembly 51 and through a flow path in the second die assembly 52.

At step 710, the actuator 81 (shown in FIG. 1) moves the first die assembly 51 away from the second die assembly.

At step 712, the user removes the vinyl record 28 from at least one of the first and second stamper plates 61, 62.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A die assembly, comprising:
a base circular-shaped plate having a primary surface and an outer ring-shaped gasket groove extending from the primary surface into the base circular-shaped plate, an inner O-ring groove extending from the primary surface into the base circular-shaped plate, and a plurality of concentric grooves extending from the primary surface into the base circular-shaped plate and being disposed between the outer ring-shaped gasket groove and the inner O-ring groove, the base circular-shaped plate having an inlet aperture extending from an outer peripheral surface thereof into the base circular-shaped plate to a central region of the base circular-shaped plate, the inlet aperture communicating with a first vertical aperture that extends from an end of the inlet aperture and through the primary surface, the base circular-shaped plate having an outlet aperture extending from the outer peripheral surface into the base circular-shaped plate, the outlet aperture communicating with a second vertical aperture that extends from an end of the outlet aperture and through the primary surface;
a contacting circular-shaped plate configured to be coupled to the base circular-shaped plate, the contacting circular-shaped plate having an engagement surface and a plurality of concentric channels extending from the engagement surface into the contacting circular-shaped plate such that a plurality of concentric finger portions is formed on the contacting circular-shaped plate, each concentric finger portion being disposed between two concentric channels of the plurality of concentric channels, the contacting circular-shaped plate having a plurality of radial passages fluidly interconnecting the plurality of concentric channels, the contacting circular-shaped plate, when coupled with the base circular-shaped plate, is disposed on the base circular-shaped plate such that each of the plurality of concentric finger portions contact the base circular-shaped plate and each is partially received by and disposed within respective one of the plurality of concentric grooves of the base circular-shaped plate, the inlet aperture fluidly communicating with the plurality of concentric channels, the outlet aperture fluidly communicating with the plurality of concentric channels, and a flow path being formed by and through the inlet aperture, the first vertical aperture, the plurality of concentric channels, the plurality of radial passages, the second vertical aperture, and the outlet aperture;
an outer ring-shaped gasket that, when the contacting circular-shaped plate is coupled with the base circular-shaped plate, is disposed in the outer ring-shaped gasket groove of the base circular-shaped plate and contact the contacting circular-shaped plate, wherein the outer ring-shaped gasket groove is configured to have a depth greater than a depth of each of the plurality of concentric grooves of the base circular-shaped plate; and
an O-ring that, when the contacting circular-shaped plate is coupled with the base circular-shaped plate, is disposed in the inner O-ring groove of the base circular-shaped plate and contact the contacting circular-shaped plate.

2. The die assembly of claim 1, wherein;
a radial width of the outer ring-shaped gasket groove being greater than a radial width of the inner O-ring groove.

3. The die assembly of claim 1, wherein:
the base circular-shaped plate having a center aperture extending therethrough;
the contacting circular-shaped plate having a center aperture extending therethrough; and
a threaded bolt being threadably disposed in the center aperture of the base circular-shaped plate and the center aperture of the contacting circular-shaped plate.

4. The die assembly of claim 1, wherein:
the base circular-shaped plate having a ring-shaped placement groove extending from the primary surface into the base circular-shaped plate, the ring-shaped placement groove extending concentrically around the outer ring-shaped gasket groove, a depth of the ring-shaped placement groove being greater than the depth of the outer ring-shaped gasket groove, the depth of the ring-shaped placement groove being greater than the of the plurality of concentric grooves, a radial width of the ring-shaped placement groove being greater than a radial width of the outer ring-shaped gasket groove; and
the contacting circular-shaped plate having a ring-shaped placement member extending outwardly from the engagement surface and around an outer periphery of the engagement surface, the ring-shaped placement member being received in the ring-shaped placement groove of the base circular-shaped plate.

5. The die assembly of claim 4, wherein:
the ring-shaped placement member of the contacting circular-shaped plate having first and second cut-out regions extending therethrough.

6. The die assembly of claim 1, wherein:
the contacting circular-shaped plate having an outer peripheral surface with first, second, third, and fourth clamping grooves disposed therein; and
the outer peripheral surface of the base circular-shaped plate having first, second, third, and fourth clamping grooves disposed therein, that are aligned with the first, second, third, and fourth clamping grooves, respectively, of the contacting circular-shaped plate.

7. The die assembly of claim 1, wherein:
the central region of the base circular-shaped plate being disposed between the inner O-ring groove and a first concentric groove of the plurality of concentric grooves disposed radially outwardly from the inner O-ring groove.

8. The die assembly of claim 7, wherein:
the first vertical aperture extending through the central region of the base circular-shaped plate and the primary surface.

9. The die assembly of claim 1, wherein:
the second vertical aperture of the base circular-shaped plate communicates with the radially outermost concentric channel of the plurality of concentric channels.

10. The die assembly of claim 1, further comprising:
a stamper plate being disposed on a stamper plate holding surface of the contacting circular-shaped plate, the stamper plate holding surface being disposed opposite to the engagement surface.

11. A method of forming a vinyl record, comprising:

providing a vinyl record manufacturing system having a first die assembly, a second die assembly, a first stamper plate coupled to the first die assembly, and a second stamper plate coupled to the second die assembly, the first die assembly including a base circular-shaped plate having a primary surface and an outer ring-shaped gasket groove extending from the primary surface into the base circular-shaped plate, an inner O-ring groove extending from the primary surface into the base circular-shaped plate, and a plurality of concentric grooves extending from the primary surface into the base circular-shaped plate and being disposed between the outer ring-shaped gasket groove and the inner O-ring groove, the base circular-shaped plate having an inlet aperture extending from an outer peripheral surface thereof into the base circular-shaped plate to a central region of the base circular-shaped plate, the inlet aperture communicating with a first vertical aperture that extends from an end of the inlet aperture and through the primary surface, the base circular-shaped plate having an outlet aperture extending from the outer peripheral surface into the base circular-shaped plate, the outlet aperture communicating with a second vertical aperture that extends from an end of the outlet aperture and through the primary surface, the base circular-shaped plate having a plurality of peripheral bolt apertures extending therethrough that are disposed radially outwardly from the outer ring-shaped gasket groove, the first die assembly further including an outer ring-shaped gasket being disposed in the outer ring-shaped gasket groove, wherein the outer ring-shaped gasket groove is configured to have a depth greater than a depth of each of the plurality of concentric grooves of the base circular-shaped plate, the first die assembly further including an O-ring being disposed in the inner O-ring groove, the first die assembly further including a contacting circular-shaped plate having an engagement surface and a plurality of concentric channels extending from the engagement surface into the contacting circular-shaped plate such that a plurality of concentric finger portions is formed on the contacting circular-shaped plate, each concentric finger portion being disposed between two concentric channels of the plurality of concentric channels, the contacting circular-shaped plate having a plurality of radial passages fluidly interconnecting the plurality of concentric channels, the contacting circular-shaped plate being disposed on the base circular-shaped plate such that each of the plurality of concentric finger portions contact the base circular-shaped plate and each is partially received by and disposed within respective one of the plurality of concentric grooves of the base circular-shaped plate, the inlet aperture fluidly communicating with the plurality of concentric channels, the outlet aperture fluidly communicating with the plurality of concentric channels, and a flow path being formed by and through the inlet aperture, the first vertical aperture, the plurality of concentric channels, the plurality of radial passages, the second vertical aperture, and the outlet aperture, the contacting circular-shaped plate having a plurality of peripheral bolt holes extending therein that are disposed radially outwardly from the plurality of concentric channels, the first die assembly further including a plurality of bolts extending through the plurality of peripheral bolt apertures of the base circular-shaped plate and further into the plurality of peripheral bolt holes of the contacting circular-shaped plate to couple the base circular-shaped plate to the contacting circular-shaped plate;

disposing a polymeric puck between the first and second stamper plates;

heating the first and second die assemblies by pumping steam through the flow path of the first die assembly and through a flow path in the second die assembly; and moving the first and second die assemblies toward one another such that the first and second stamper plates compress the polymeric puck to form the vinyl record.

12. The method of claim 11, further comprising:

cooling the first and second die assemblies by pumping a cooled fluid through the flow path of the first die assembly and through the flow path in the second die assembly;

moving the first and second die assemblies away from one another; and removing the vinyl record from at least one of the first and second stamper plates.

* * * * *